US009541690B2

(12) United States Patent
Nara et al.

(10) Patent No.: US 9,541,690 B2
(45) Date of Patent: Jan. 10, 2017

(54) FILM USING POLYMERIZABLE LIQUID CRYSTAL COMPOSITION CONTAINING PEELING PREVENTIVE AGENT

(71) Applicants: JNC CORPORATION, Tokyo (JP); JNC PETROCHEMICAL CORPORATION, Tokyo (JP)

(72) Inventors: Kazumi Nara, Ichihara (JP); Junichi Inagaki, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/220,975

(22) Filed: Mar. 20, 2014

(65) Prior Publication Data

US 2014/0308462 A1 Oct. 16, 2014

(30) Foreign Application Priority Data

Apr. 11, 2013 (JP) .................................. 2013-083290

(51) Int. Cl.
*C09K 19/00* (2006.01)
*G02B 5/30* (2006.01)
(Continued)

(52) U.S. Cl.
CPC ............. *G02B 5/3083* (2013.01); *C09K 19/28* (2013.01); *C09K 19/32* (2013.01); *C09K 19/54* (2013.01);
(Continued)

(58) Field of Classification Search
CPC .............. G02F 1/1337; G02F 1/133711; G02F 1/13378; G02F 1/133784; G02F 1/133788; G02F 1/13363; G02F 2001/133742; G02F 2001/133631; G02F 2001/133633; G02F 2001/133635; G02B 5/32; G02B 27/26; C09K 19/546; C09K 2019/0449; C09K 2019/546; C09K 2019/548; Y10T 428/10; Y10T 428/1005
(Continued)

(56) References Cited

U.S. PATENT DOCUMENTS 5,861,936 A      1/1999   Sorensen .................... 351/200
2006/0192746 A1  8/2006   Ioki et al. ................... 345/102
(Continued)

FOREIGN PATENT DOCUMENTS

JP    H 10-232364 A    9/1998
JP    2002-372623 A   12/2002
(Continued)

*Primary Examiner* — Ruiyun Zhang
(74) *Attorney, Agent, or Firm* — Stein IP, LLC

(57) ABSTRACT

A problem is, in a liquid crystal film in which an alignment layer and a liquid crystal composition layer having homogeneous alignment are formed on a support substrate, to improve adhesion between the alignment layer and the liquid crystal composition layer, and durability under a severe environment such as high temperature and high humidity. A solution is a non-liquid crystalline polymerizable compound having a radically polymerizable group and a cationically polymerizable group in a molecule is simultaneously used as an antistripping additive in a polymerizable liquid crystal composition layer having homogeneous alignment.

17 Claims, 2 Drawing Sheets

(51) Int. Cl.
*G02B 27/26* (2006.01)
*C09K 19/28* (2006.01)
*C09K 19/32* (2006.01)
*C09K 19/54* (2006.01)
*G02F 1/13363* (2006.01)
*C09K 19/04* (2006.01)
*C09K 19/12* (2006.01)
*C09K 19/20* (2006.01)
*C09K 19/34* (2006.01)

(52) U.S. Cl.
CPC ....... *G02B 27/26* (2013.01); *C09K 2019/0448* (2013.01); *C09K 2019/122* (2013.01); *C09K 2019/2035* (2013.01); *C09K 2019/2078* (2013.01); *C09K 2019/3416* (2013.01); *C09K 2219/03* (2013.01); *G02F 2001/133631* (2013.01); *Y10T 428/10* (2015.01); *Y10T 428/1005* (2015.01)

(58) Field of Classification Search
USPC ... 428/1.1, 1.2, 1.3; 349/117, 118, 123, 127, 349/132
See application file for complete search history.

(56) References Cited

U.S. PATENT DOCUMENTS

| | | | |
|---|---|---|---|
| 2008/0014374 A1 | 1/2008 | Hirai | 428/1.1 |
| 2008/0241431 A1 | 10/2008 | Hirai | 428/1.31 |
| 2008/0304151 A1 | 12/2008 | Ura | 359/466 |
| 2012/0165491 A1* | 6/2012 | Ootsuki et al. | 526/321 |

FOREIGN PATENT DOCUMENTS

| | | |
|---|---|---|
| JP | 2004-264338 A | 9/2004 |
| JP | 2008-266550 A | 11/2008 |
| JP | 2008-266632 A | 11/2008 |
| JP | 2008-304909 A | 12/2008 |
| WO | WO 2011/049326 A2 | 4/2011 |

* cited by examiner

FILM USING POLYMERIZABLE LIQUID CRYSTAL COMPOSITION CONTAINING PEELING PREVENTIVE AGENT

CROSS-REFERENCE TO RELATED APPLICATIONS

This application claims the benefit of Japanese Application No. 2013-083290, filed Apr. 11, 2013, in the Japanese Patent Office. All disclosures of the document(s) named above are incorporated herein by reference.

BACKGROUND OF THE INVENTION

1. Field of the Invention

The present invention relates to a film having optical anisotropy (optically anisotropic film) that is obtained using a polymerizable liquid crystal composition containing an antistripping additive, and a liquid crystal display device including the optically anisotropic film.

2. Description of the Related Art

A polymerizable liquid crystal compound is used for an optically anisotropic film such as a polarizing plate, a polarized light reflecting plate and a retardation film (Patent literature No. 1). The reason is that the compound shows optical anisotropy in a liquid crystal state and the anisotropy is immobilized by polymerization. Optical characteristics required for the optically anisotropic film are different depending on a purpose, and therefore a compound having characteristics fit for the purpose is required. Control of the anisotropy is difficult alone by a compound used for an optical isomer in many cases. Therefore, such a compound may be occasionally used in the form of a composition in combination with various compounds.

The polymerizable liquid crystal composition may be occasionally used in the form of ink prepared by adding an organic solvent in order to adjust coating properties. In order to manufacture a film having optical anisotropy by using the polymerizable liquid crystal composition, the polymerizable liquid crystal compound, a photopolymerization initiator, a surfactant and so forth are dissolved into the organic solvent to prepare ink in which solution viscosity, levelability or the like is adjusted. The ink is applied to a substrate subjected to alignment treatment to dry a solvent to align a polymerizable liquid crystal composition on the substrate. Next, the composition is irradiated with ultraviolet light and polymerized, thereby immobilizing an alignment state.

The present inventors have so far found a polymerizable liquid crystal compound allowing formation of uniform homeotropic alignment on a glass substrate or a plastic substrate without forming an alignment layer on a support substrate using the polymerizable liquid crystal compound, and having excellent adhesion (Patent literature Nos. 6 and 7).

Moreover, as an apparatus allowing an observer to recognize a three-dimensional image, an image display apparatus is known in which the apparatus include an image generation part for displaying an image for a right eye and an image for a left eye on different regions, respectively, and a polarization axis control plate for mutually orthogonalizing polarization axes of polarized light entered into two different regions (see Patent literature Nos. 2 to 4, for example). A retardation film used for the three-dimensional image display apparatus is mainly formed into a patterned retardation film prepared by applying a polymerizable liquid crystal compound having a liquid crystal phase as a retardation material onto an alignment layer subjected to patterned alignment treatment, and photocuring the applied material. The polymerizable liquid crystal composition mainly used for the patterned retardation film forms homogeneous alignment, and an alignment layer is substantially necessary to form the homogeneous alignment. For the alignment layer, polyimide obtained by heating and imidizing polyamic acid is widely used, but imidization requires heating to 200° C. or higher, and thus use of such polyimide for a plastic substrate is quite difficult. A method for directly rubbing a plastic substrate is also applied without using polyimide, special facilities are necessary for removing dust and static electricity generated by the rubbing.

Consequently, a photoalignment technique also has been recently applied in which a certain polymer solution is applied to a plastics substrate, and then the applied material is irradiated with polarized ultraviolet light to provide the material with alignment ability. However, the technique has a problem of insufficient adhesion and durability of an interface between an alignment layer and a liquid crystal composition layer in a patterned retardation film including only the polymerizable liquid crystal compound. The insufficient adhesion and durability may occasionally cause, for example, when a protective film is stuck on the patterned retardation film for preventing scratching or dirt or the like during transportation, deposition of a liquid crystal composition layer of the patterned retardation film onto an adhesive surface side of the protective film upon removing the protective film to damage the patterned retardation film. In order to solve such a problem, a patterned retardation film formed of a liquid crystal composition layer containing an antistripping additive has been desired (see Patent literature No. 5). In Patent literature Nos. 6 and 7 as described above, study has been conducted on adhesion between a liquid crystal composition layer in homeotropic alignment, but no study has been conducted on adhesion and durability of a liquid crystal composition layer in homogeneous alignment. In particular, no study has been made on durability under a severe environment such as high humidity and high temperature.

CITATION LIST

Patent Literature

Patent literature No. 1: JP 2002-372623 A.
Patent literature No. 2: JP H10-232364 A.
Patent literature No. 3: JP 2004-264338 A.
Patent literature No. 4: JP 2008-304909 A.
Patent literature No. 5: WO 2011/049326 A.
Patent literature No. 6: JP 2008-266550 A.
Patent literature No. 7: JP 2008-266632 A.

SUMMARY OF THE INVENTION

Technical Problem

An object of the invention is to improve adhesion between an alignment layer and a liquid crystal composition layer and durability under a severe environment such as high temperature and high humidity in a liquid crystal film in which the alignment layer and a liquid crystal composition layer in homogeneous alignment are formed on a support substrate.

Solution to Problem

The present inventors have found that, when a non-liquid crystalline polymerizable compound having a radically polymerizable group and a cationically polymerizable group in a molecule thereof is used as an antistripping additive together with a polymerizable liquid crystal composition in homogeneous alignment for forming a retardation film, adhesion between a liquid crystal composition layer and an alignment layer subjected to alignment treatment to be formed on a support substrate, and durability under a severe environment such as high temperature and high humidity are improved, and thus have completed the invention based on the findings. The antistripping additive has two or more polymerizable groups, and can be polymerized in a manner similar to the polymerizable liquid crystal compound. The invention is as described below.

Item 1. A film having at least an alignment layer and a liquid crystal composition layer in the order on a support substrate, wherein the liquid crystal composition layer is obtained by immobilizing alignment of a polymerizable liquid crystal compound contained in the polymerizable liquid crystal composition layer, and an alignment state thereof is homogeneous, and the polymerizable liquid crystal composition layer contains one kind or two or more kinds of antistripping additives having a radically polymerizable group and a cationically polymerizable group in a molecule.

Item 2. The film according to item 1, wherein the radically polymerizable group of the antistripping additive includes an acryloyloxy group, a methacryloyloxy group, a maleimide group or a vinyl ketone group.

Item 3. The film according to item 1 or 2, wherein the cationically polymerizable group of the antistripping additive includes an oxiranyl group, an oxetanyl group or a vinyl ether group.

Item 4. The film according to any one of items 1 to 3, containing 0.1 to 20% by weight of one kind or two or more kinds of antistripping additives based on the total weight of the polymerizable liquid crystal compound.

Item 5. The film according to any one of items 1 to 4, wherein the alignment layer includes a (meth)acrylate polymer, and a monomer used for forming the polymer includes photodimerizing or photoisomerizing structure as a photosensitive site.

Item 6. The film according to any one of items 1 to 5, wherein a method for controlling an alignment direction of the polymerizable liquid crystal compound includes any one of a rubbing method, a photoalignment treatment method, a nanoimprinting method and an orientation method.

Item 7. A liquid crystal display device using the film according to any one of items 1 to 6.

Item 8. A three-dimensional image display apparatus to which the liquid crystal display device according to item 7 is applied.

Advantageous Effects of Invention

In a polymerizable liquid crystal film in which an alignment layer and a retardation film in homogeneous alignment are formed on a support substrate, addition of a antistripping additive having a radically polymerizable group and a cationically polymerizable group in a molecule to a polymerizable liquid crystal compound allows improvement in adhesion between the alignment layer and a liquid crystal composition layer and durability under a severe environment such as high temperature and high humidity. Thus, productivity of a three-dimensional image display apparatus using the film is improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
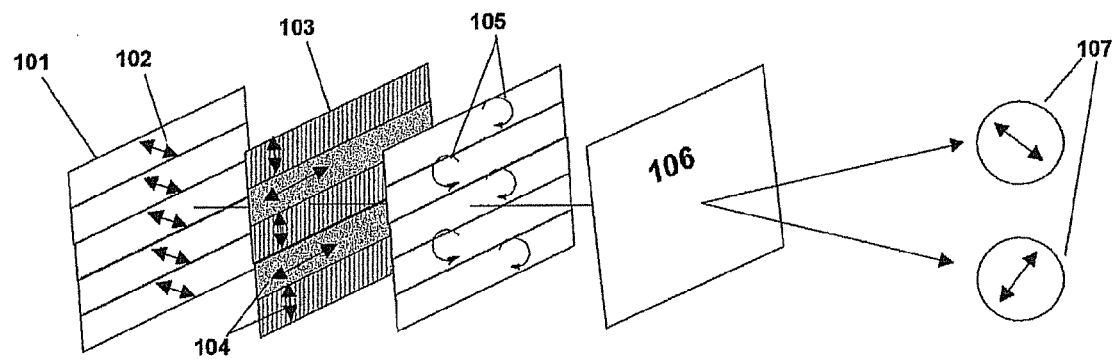
FIG. 1 is a diagram showing an example of a three-dimensional image display apparatus using a patterned retardation film taking a state in which thickness of a liquid crystal composition layer is identical and an alignment direction is mutually different in adjacent regions.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A support substrate is a generic term for a glass plate or an optical plastic film.

A liquid crystal compound is a generic term for a compound having a liquid crystal phase, and a compound having no liquid crystal phase but being useful as a component of a liquid crystal composition. The liquid crystal phase includes a nematic phase, a smectic phase and a cholesteric phase and means the nematic phase in many cases. In the liquid crystal phase, a liquid crystal state (anisotropy) disappears and becomes a liquid state at a temperature higher than a temperature range of the liquid crystal phase. The liquid state is in a state of an isotropic phase. Polymerizing properties mean capability of a monomer to polymerize by means of light, heat, a catalyst or the like to give a polymer. A compound represented by formula (M1) and formula (M2) may be occasionally described as compound (M1) and compound (M2). A same rule also applies to any other compound represented by any other formula. (Meth)acrylate represents either one or both of acrylate and methacrylate. In a chemical formula, a substitute on a benzene ring in which a bonding hand is represented without bonding with any one of carbon atoms constituting the benzene ring represents that a bonding position is arbitrary.

In the invention, a polymerizable liquid crystal compound is a generic term for the polymerizable liquid crystal compound used alone or a compound group in which a plurality of kinds compounds are simultaneously used. In order to facilitate clear expression of a ratio of polymerizable liquid crystal compounds, the polymerizable liquid crystal compound is described, for convenience, in the form of a system without containing a solvent. Then, a solution formed of the polymerizable liquid crystal compound and the solvent is described as the solution of the polymerizable liquid crystal compound. When the solvent is contained, the solution of the polymerizable liquid crystal compounds is prepared by dissolving each component of the polymerizable liquid crystal compound in the solvent.

Alignment of the polymerizable liquid crystal compound is classified into homogeneous (parallel), homeotropic (vertical), tilted (inclined), twisted (twist) or the like based on magnitude of a tilt angle or the like. The tilt angle refers to an angle between a support substrate and an alignment state of the polymerizable liquid crystal compound. "Homogeneous" means a state in which the alignment state of the polymerizable liquid crystal compound is parallel to the substrate and aligned in one direction in a predetermined alignment treatment region. An example of the tilt angle in the homogeneous alignment is approximately 0 degrees to approximately 5 degrees. "Homeotropic" means a state in which an alignment state is vertical to the substrate. An example of the tilt angle in the homeotropic alignment is approximately 85 degrees to approximately 90 degrees. "Tilted" means a state in which the alignment state further vertically rises from a state of parallel to the substrate as the alignment state is further separated from the substrate. An example of the tilt angle in the tilt alignment is approximately 5 degrees to approximately 85 degrees. "Twisted" means a state in which the alignment state is parallel to the substrate but twisted stepwise centering on a helical axis. An example of the tilt angle in the twist alignment is approximately 0 degrees to approximately 5 degrees.

An antistripping additive is a generic term for a polymerizable compound having a polymerizable group for preventing peeling of a liquid crystal composition layer and an alignment layer subjected to alignment treatment, or a polymer thereof.

Figure 3:
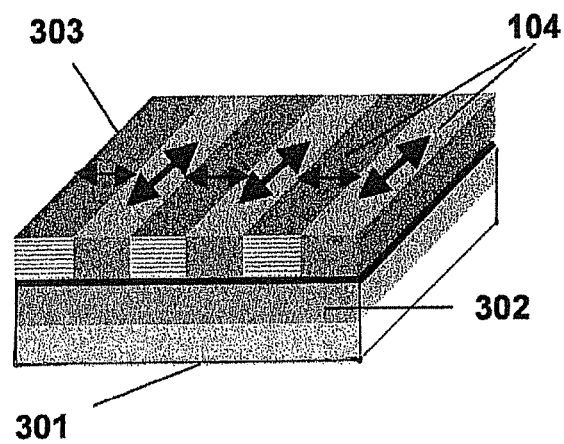
FIG. 3 is a schematic diagram showing a patterned retardation film taking a state in which thickness of a liquid crystal composition layer is identical and an alignment direction is mutually different in adjacent regions.
Figure 4:
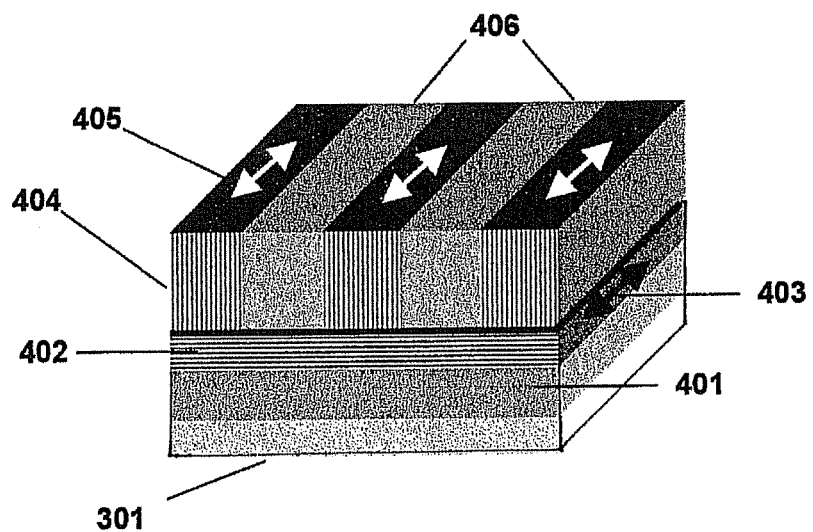
FIG. 4 is a schematic diagram showing a patterned retardation film in which a liquid crystal composition layer of adjacent regions is cured in the form of an isotropic phase in which a liquid crystal phase disappears.

"Patterned" for alignment of the polymerizable liquid crystal compound represents a state in which thickness of the liquid crystal composition layer is identical and an alignment direction is mutually different in adjacent regions (see FIG. 3), or a state in which the liquid crystal composition layer in adjacent regions is removed with a solvent or the like, or cured in a state of an isotropic phase in which the liquid crystal phase is allowed to disappear (see FIG. 4).

"Film" refers to "retardation film" and is a laminate in which at least a liquid crystal composition layer is formed on a support substrate. The liquid crystal composition layer is obtained by immobilizing the alignment of the polymerizable liquid crystal compound contained in the polymerizable liquid crystal composition layer. "Retardation film" also includes "patterned" retardation film.

Figure 2:
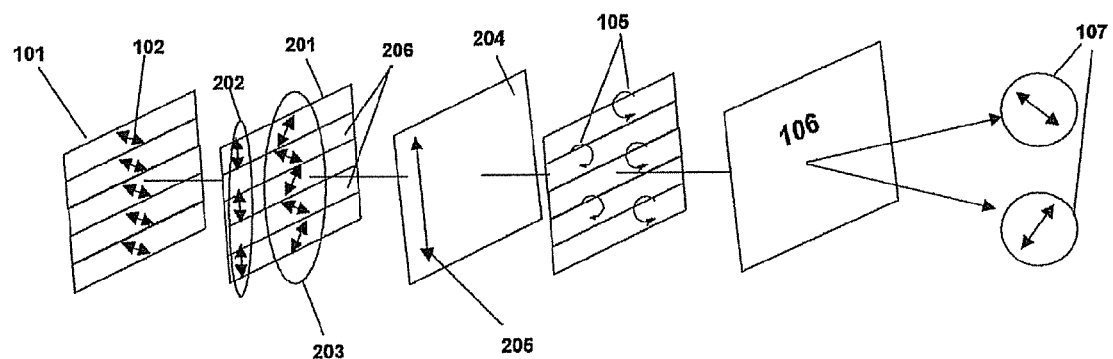
FIG. 2 is a diagram showing an example of a three-dimensional image display apparatus using a patterned retardation film taking a state in which a liquid crystal composition layer in adjacent regions is cured in the form of an isotropic phase in which a disappeared liquid crystal phase disappears.

The film related to the invention can be used for a three-dimensional image display apparatus. The three-dimensional image display apparatus can display a three-dimensional image by using patterned retardation film 103 or patterned retardation film 201, as shown in FIG. 2 or 3. FIG. 3 is a schematic diagram showing a patterned retardation film utilizing a state in which thickness of liquid crystal composition layer 303 is identical and an alignment direction is mutually different in adjacent regions. FIG. 4 is a schematic diagram showing a patterned retardation film utilizing a state in which adjacent liquid crystal composition layers are cured in an isotropic phase. In FIGS. 2 and 4, two kinds of liquid crystal composition layers are arranged. A first liquid crystal composition layer is designated as 204 and 402, and a second liquid crystal composition layer is designated as 201 and 404. The first liquid crystal composition layer includes a retardation film in which an alignment direction in a plane is identical, the second liquid crystal composition layer includes a (patterned) retardation film in which the alignment direction is different in adjacent regions in a plane, and materials of the first liquid crystal composition layer and the second liquid crystal composition layer may be identical or different.

The patterned retardation film shown in FIG. 3 can be obtained by treating alignment layer 302 in advance as described below. In order to produce a state in which a thickness of the liquid crystal composition layer 303 is identical in the adjacent regions and the alignment directions are mutually different, specific examples include a rubbing method, a photoalignment method and a nanoimprinting method. In the rubbing method, alignment layer 302 of polyimide, polyvinyl alcohol or the like is formed on support substrate 301, and then an entire region is first subjected to rubbing treatment, and subsequently rubbing is performed in a direction different from the first rubbing direction in a state in which a mask is placed on the alignment layer 302. Alternatively, specific examples include a method described in WO 2011/049326 A.

When the photoalignment method is applied, a photoalignment layer 302 having a site reacting with ultraviolet light is formed on support substrate 301, and the photoalignment layer is irradiated with polarized ultraviolet light using a photomask. Next, the photomask is shifted, and a part unirradiated with the polarized ultraviolet light is irradiated with polarized ultraviolet light in a polarization axis different from the direction of the polarization axis of the first polarized ultraviolet light. Alternatively, specific examples include a method described in JP 2012-14064 A. When the polymerizable liquid crystal compound is applied to the alignment layer subjected to such prior treatment, and the alignment layer is heated and photocured, the patterned retardation film 103 in FIG. 1 is obtained.

Alternatively, specific examples include a method for directly pressing a mold onto a polymerizable liquid crystal composition layer using the nanoimprinting method. Specific examples include a method of pressing a mold on an aligned polymerizable liquid crystal composition layer, such as a method described in Journal of Nanoscience and Nanotechnology Vol. 8 p. 4775 to 4778 (2008).

In the patterned retardation film shown in FIG. 4, alignment layer 401 is formed on support substrate 301, and then subjected to rubbing treatment, photoalignment treatment or nanoimprint treatment, and subsequently a polymerizable liquid crystal compound is coated, heated and photocured to form first liquid crystal composition layer 402. Here, an optical film subjected to stretching treatment may be used in place of the first liquid crystal composition layer 402 and the alignment layer 401. Next, second liquid crystal composition layer 404 is coated onto the liquid crystal composition layer 402 or the optical film subjected to stretching treatment, directly or through the alignment layer. Then, when partial photocuring is performed using a photomask, an uncured part is removed with a solvent, or heated to allow photocuring or thermosetting in a state of an isotropic phase, the patterned retardation film 201 is obtained. Specific examples include a method described in SID 2008 DIGEST p. 260 to 263.

The antistripping additive is formed of a compound having two or more polymerizable groups including different polymerization mechanisms in one molecule. In the invention, the compound having the radically polymerizable group and the cationically polymerizable group in one molecule is used as the antistripping additive. A commercial item may be sufficient as such an antistripping additive. The compounds interact with the polymerizable group or a polar group of the alignment layer. A variety of interaction mechanisms may be considered, but a hydrogen bond or an intermolecular interaction is thought to play a central role. The interaction is presumed to cause promotion of adhesion force of the antistripping additive and the alignment layer for the polymerizable liquid crystal compound and the antistripping additive to copolymerize, thereby adhesion as the patterned retardation film being secured.

Specific examples of the radically polymerizable group include an acryloyloxy group, a methacryloyloxy group, a maleimide group and a vinyl ketone group.

Specific examples of the cationically polymerizable group include an oxiranyl group, an oxetanyl group and a vinyl ether group.

One kind or two or more kinds of such antistripping additives can be used. The antistripping additive is added, preferably in an amount of approximately 0.1 to approximately 20% by weight, further preferably, in an amount of approximately 0.5 to approximately 15% by weight, and further preferably, in an amount of approximately 1 to approximately 10% by weight, based on the total weight of the polymerizable liquid crystal compound.

As the antistripping additive, a compound represented by general formula (A1) or (A2) described below is preferred.

Formula 1

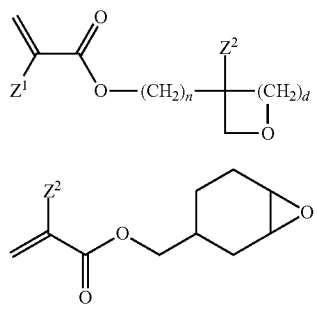

In (A1) and (A2), $Z^1$ is independently hydrogen or methyl; $Z^2$ is independently hydrogen, methyl or ethyl; n is an integer from 1 to 10; and d is 0 or 1.

Specific examples of (A1) and (A2) include glycidyl methacrylate (BLEMMER (registered trademark) G series made by NOF CORPORATION), methyl glycidyl methacrylate (M-GMA made by Daicel Corporation), oxetane acrylate (OXE-10 made by OSAKA ORGANIC CHEMICAL INDUSTRY LTD.), oxetane methacrylate (OXE-30 made by OSAKA ORGANIC CHEMICAL INDUSTRY LTD.) and epoxycyclohexyl methacrylate (made by Daicel Corporation).

A compound used as the polymerizable liquid crystal compound preferably includes a liquid crystal compound having one kind or two or more kinds of polymerizable groups. The polymerizable liquid crystal compound used in the invention can be synthesized by appropriately combining synthesis methods in organic chemistry described in Houben Wyle, Methoden der Organischen Chemie, Georg Thieme Verlag, Stuttgart, Organic Reactions, John Wily & Sons Inc., Organic Syntheses, John Wily & Sons, Inc., Comprehensive Organic Synthesis, Pergamon Press, New Experimental Chemistry Course (Shin Jikken Kagaku Koza, in Japanese) (Maruzen Co., Ltd.) and so forth. Specific examples include compounds described in JP 2011-148762 A, WO 93/22397 A, WO 95/22586 A, WO 97/00600 A, GB 2351734 A, DE 19504224 A and EP 0261712 A. The polymerizable liquid crystal compounds described in the literatures are illustrative, and do not limit the scope of the invention.

Specific examples of the polymerizable liquid crystal compound include compounds represented by formulas described below, but are illustrative only, and do not limit the scope of the invention.

Formula 2

 (M1)

 (M2)

In formula (M1) and formula (M2), $P^1$ is independently a polymerizable group, and preferably, an acryloyloxy group, a methacryloyloxy group, a vinyl group, a vinyloxy group, a propenyl ether group, a glycidyl group, a glycidyl ether group, an oxetanyl group, an oxetanyl ether group, a maleimide group, a maleimide carboxyl group, a thiol group and a styryl group.

Then, $R^1$ is independently hydrogen, fluorine, chlorine, —CN or alkyl having 1 to 20 carbons, and in the alkyl, arbitrary —$CH_2$— may be replaced by —O—, —COO— or —OCO—, and arbitrary hydrogen may be replaced by halogen.

$A^1$ is independently 1,4-cyclohexylene, 1,4-phenylene, pyridine-2,5-diyl, pyrimidine-2,5-diyl, naphthalene-2,6-diyl or fluorene-2,7-diyl, but arbitrary hydrogen may be replaced by halogen, alkyl having 1 to 5 carbons or alkyl halide having 1 to 5 carbons.

Then, $X^1$ is independently a single bond or alkylene having 1 to 20 carbons, and arbitrary —$CH_2$— in the alkylene may be replaced by —O—, —COO— or —OCO—.

Then, $Z^1$ is independently a single bond, —COO—, —OCO—, —$CH_2CH_2$—, —CH=CH—, —C≡C—, —$CH_2O$—, —$OCH_2$—, —$CF_2O$—, —$OCF_2$—, —$CH_2CH_2COO$—, —$OCOCH_2CH_2$—, —CH=CHCOO— or —OCOCH=CH—.

Further, s is independently an integer from 1 to 5.

More specific examples include compounds as described below.

Formula 3

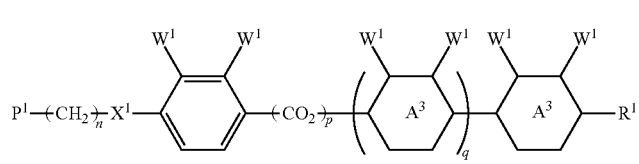 (M1a)

(M1b)
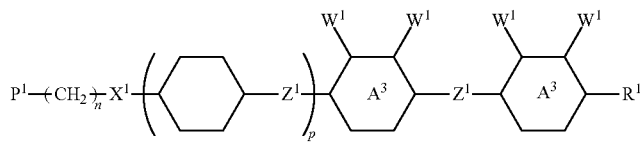

(M1c)
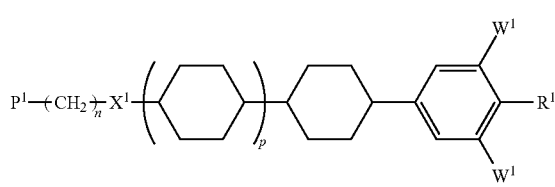

(M2a)
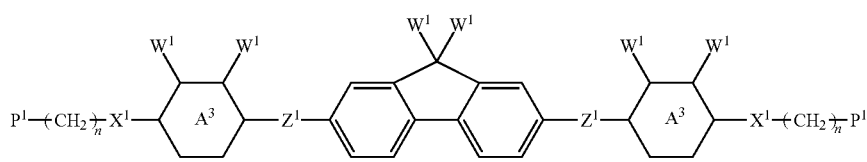

(M2b)
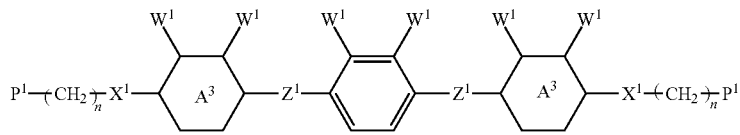

(M2c)
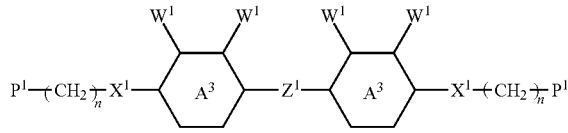

The above-described —$CO_2$— is synonymous with —OCO—. In formulas (M1a) to (M2c), $P^1$ is independently a polymerizable group, and is an acryloyloxy group, a methacryloyloxy group, a vinyl group, a vinyloxy group, a propenyl ether group, a glycidyl group, a glycidyl ether group, an oxetanyl group, an oxetanyl ether group, a maleimide group, a maleimide carboxyl group, a thiol group or a styryl group. $P^1$ is preferably an acryloyloxy group, a methacryloyloxy group, a glycidyl group, a glycidyl ether group, an oxetanyl group or an oxetanyl ether group.

$R^1$ is independently hydrogen, fluorine, chlorine, —CN or alkyl having 1 to 20 carbons, and in the alkyl, arbitrary —$CH_2$— may be replaced by —O—, —COO— or —OCO—, and arbitrary hydrogen may be replaced by halogen.

Ring $A^3$ is independently 1,4-cyclohexylene or 1,4-phenylene.

$W^1$ is independently hydrogen, halogen, alkyl having 1 to 5 carbons or alkyl halide having 1 to 5 carbons.

$X^1$ is independently a single bond or alkylene having 1 to 20 carbons, and arbitrary —$CH_2$— in the alkylene may be replaced by —O—, —COO— or —OCO—.

$Z^1$ is independently —COO—, —OCO—, —$CH_2CH_2$—, —$CH_2O$—, —$OCH_2$—, —$CH_2CH_2COO$—, —$OCOCH_2CH_2$—, —CH=CHCOO— or —OCOCH=CH—.

Then, p and q are independently 0 or 1.

Further, n is independently an integer from 0 to 20.

Formula 4

(M1a-1)
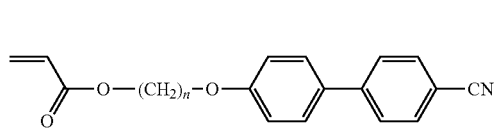

(M1a-2)
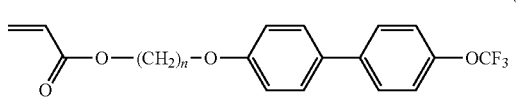

(M1a-3)
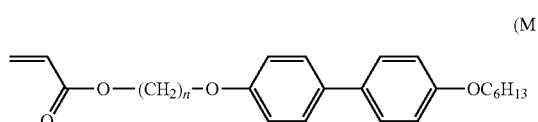

(M1a-4)
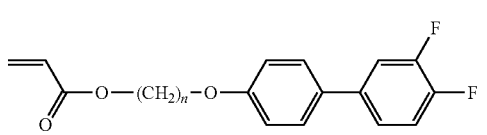

-continued
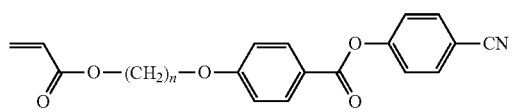
(M1a-5)
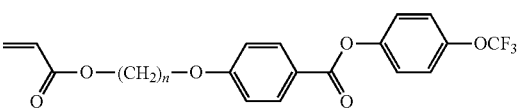
(M1a-6)
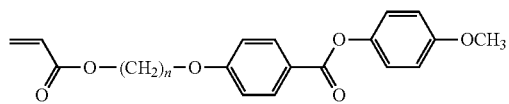
(M1a-7)
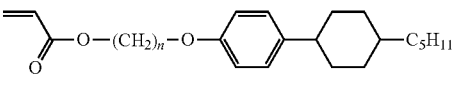
(M1a-8)
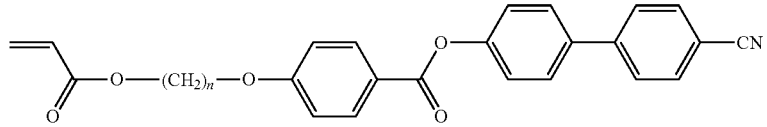
(M1a-9)
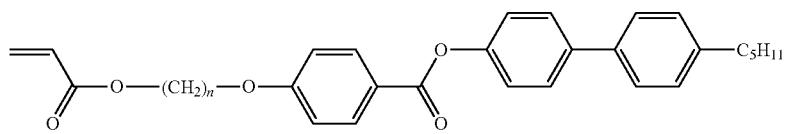
(M1a-10)
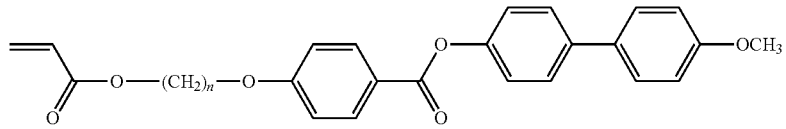
(M1a-11)
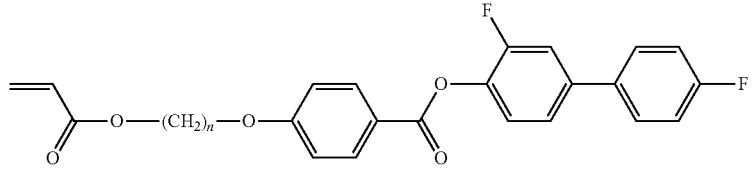
(M1a-12)
Here, n is independently an integer from 0 to 20, preferably, 1 to 15, and further preferably, 2 to 10.
Formula 5
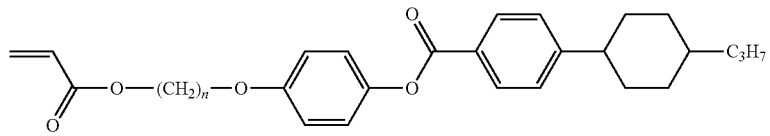
(M1a-13)
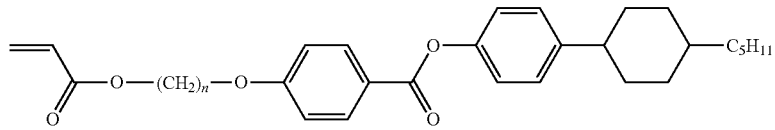
(M1a-14)
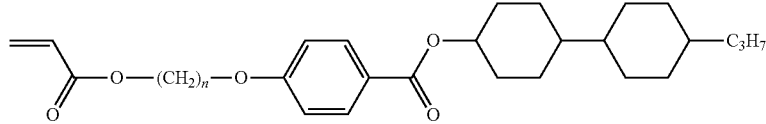
(M1a-15)
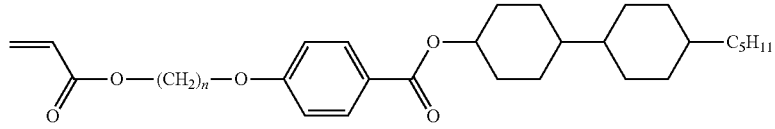
(M1a-16)

-continued
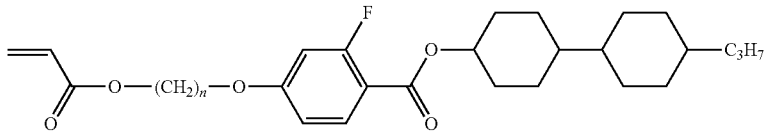 (M1a-17)
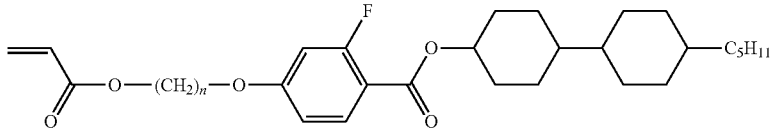 (M1a-18)
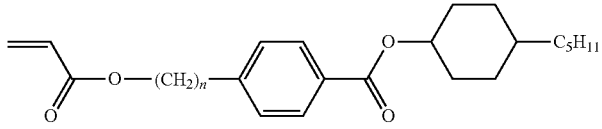 (M1a-19)
Here, n is independently an integer from 0 to 20, preferably, 1 to 15, and further preferably, 2 to 10.
Ss
Formula 7
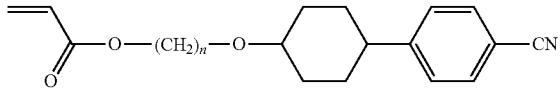 (M1c-1)
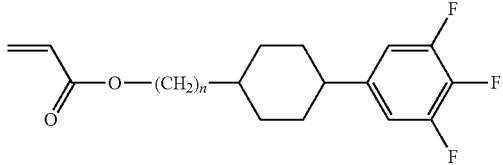 (M1c-2)
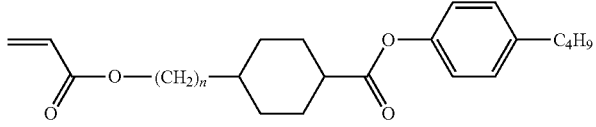 (M1c-3)
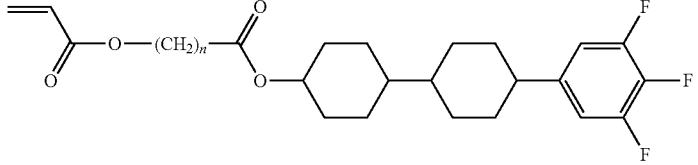 (M1c-4)
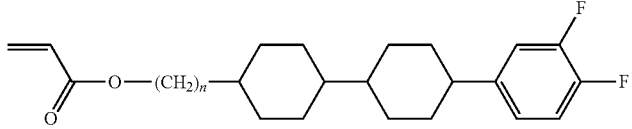 (M1c-5)

Here, n is independently an integer from 0 to 20, preferably, 1 to 15, and further preferably, 2 to 10.
Formula 8
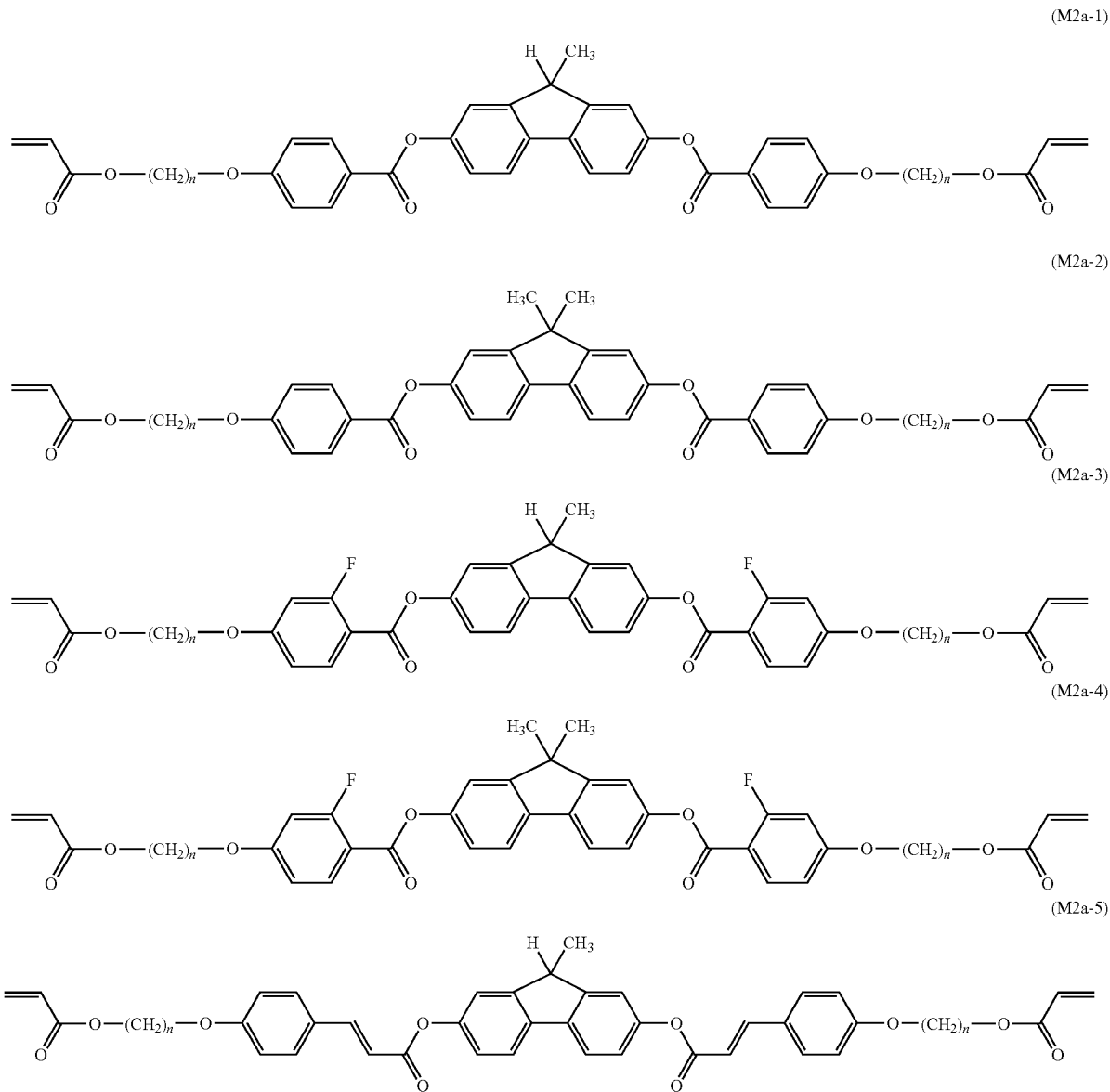
Here, n is independently an integer from 0 to 20, preferably, 1 to 15, and further preferably, 2 to 10.
Formula 9
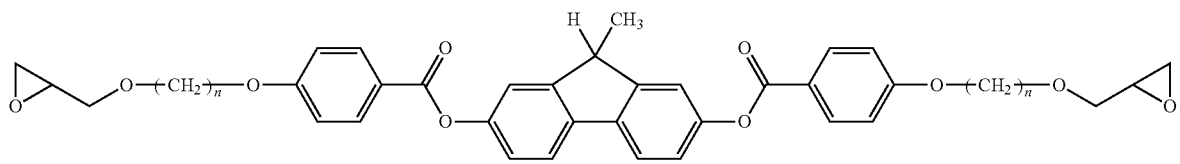

-continued
(M2a-7)
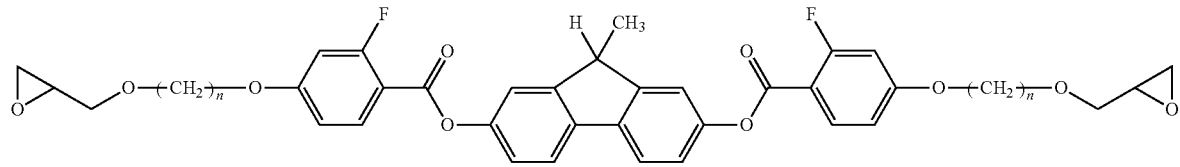
(M2a-8)
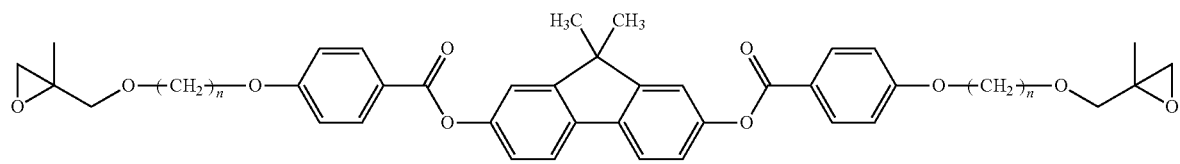
(M2a-9)
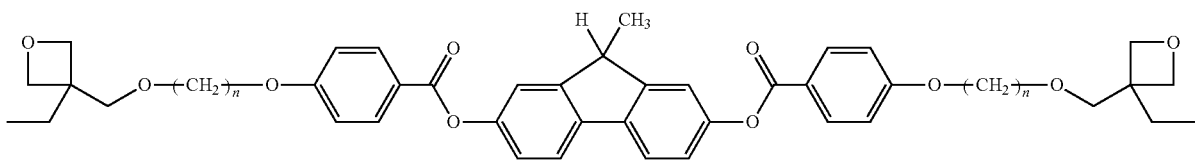
(M2a-10)
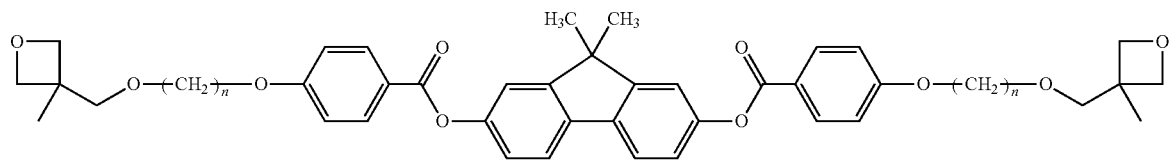
(M2a-11)
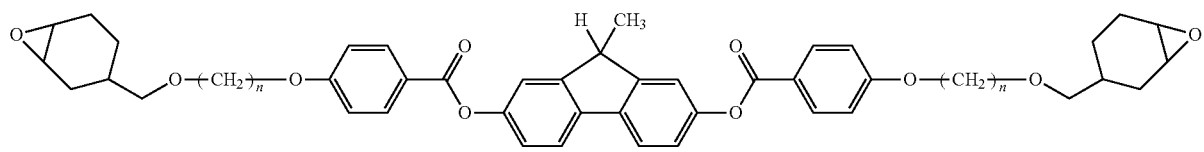
Here, n is independently an integer from 0 to 20, preferably, 1 to 15, and further preferably, 2 to 10.
Formula 10
(M2b-1)
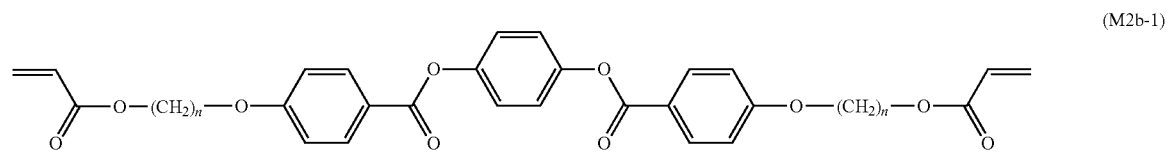
(M2b-2)
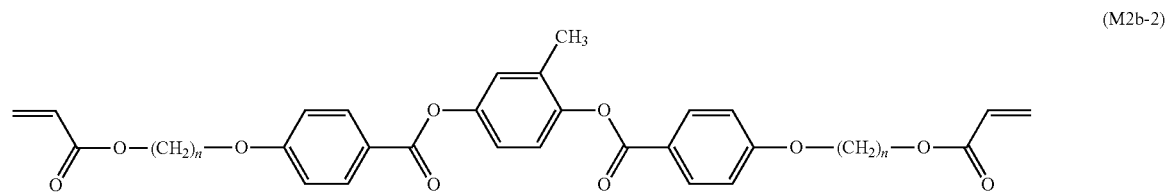

-continued
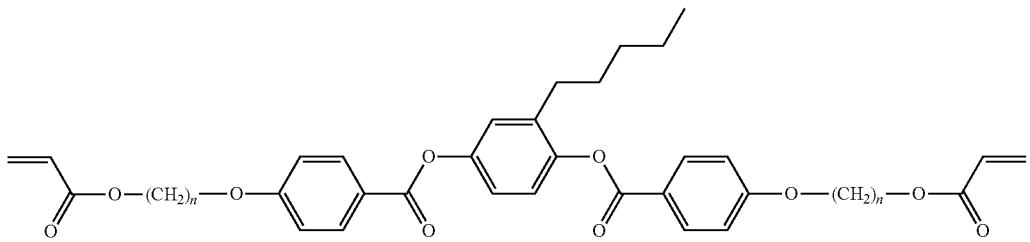
(M2b-3)
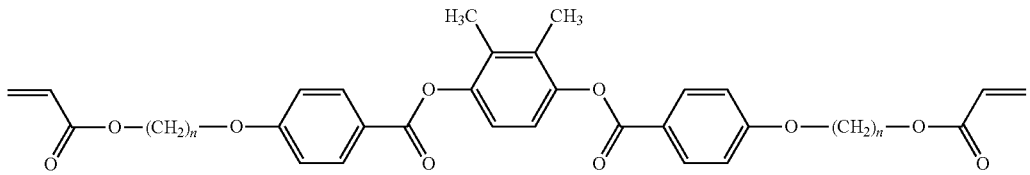
(M2b-4)
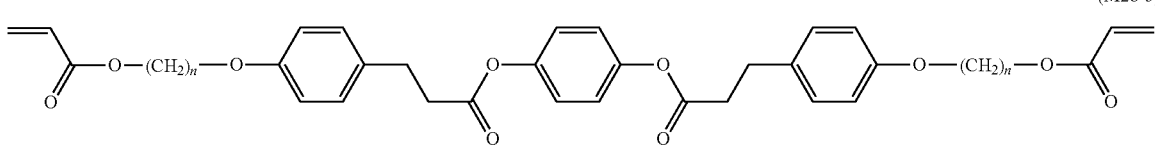
(M2b-5)
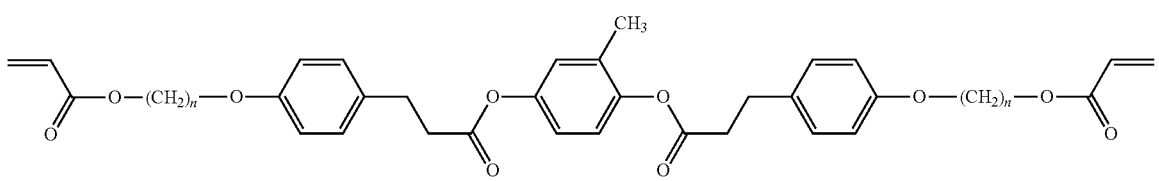
(M2b-6)
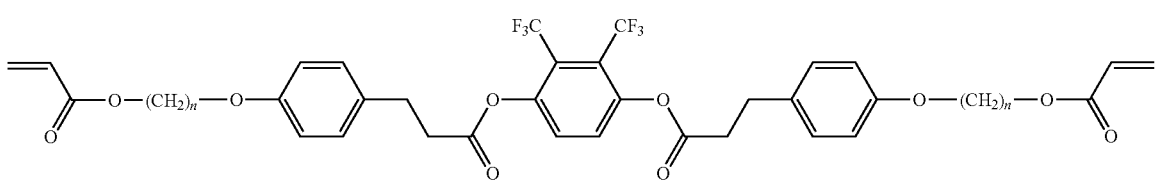
(M2b-7)
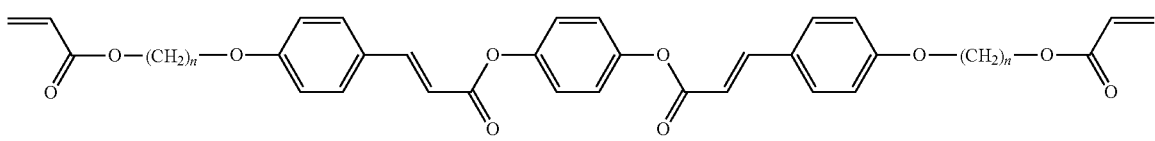
(M2b-8)
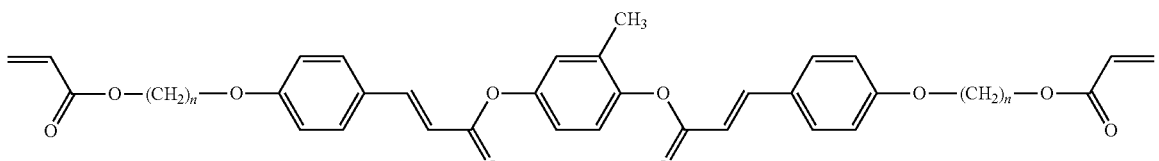
(M2b-9)
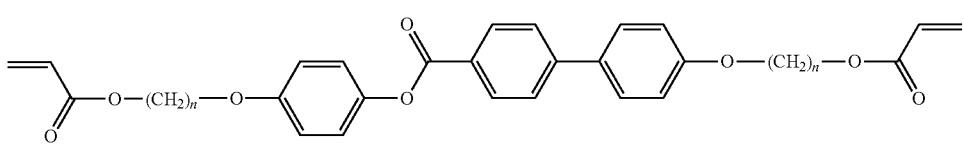
(M2b-10)

Here, n is independently an integer from 0 to 20, preferably, 1 to 15, and further preferably, 2 to 10.
Formula 11
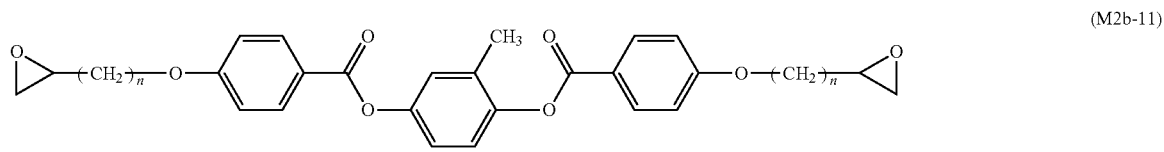
(M2b-11)
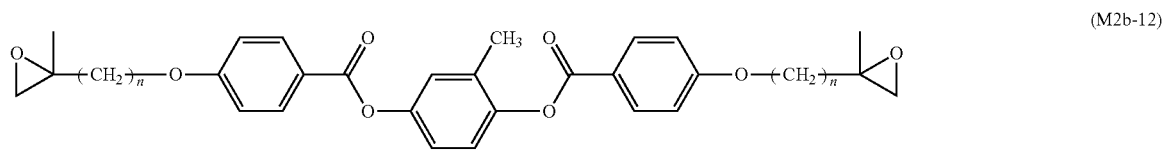
(M2b-12)
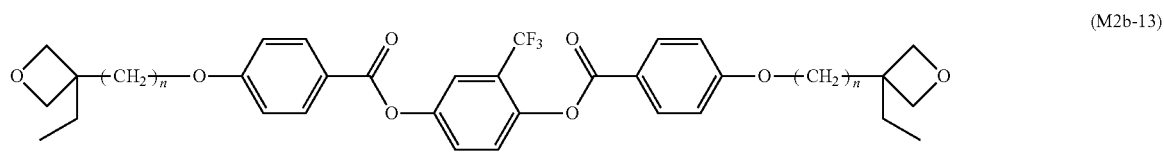
(M2b-13)
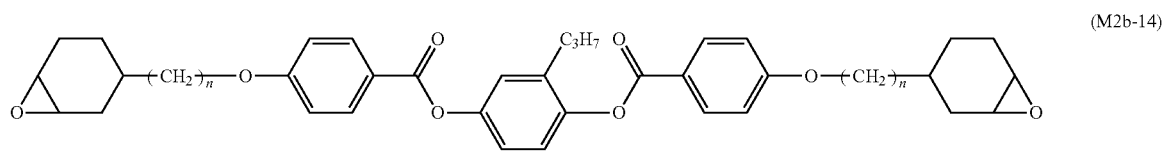
(M2b-14)
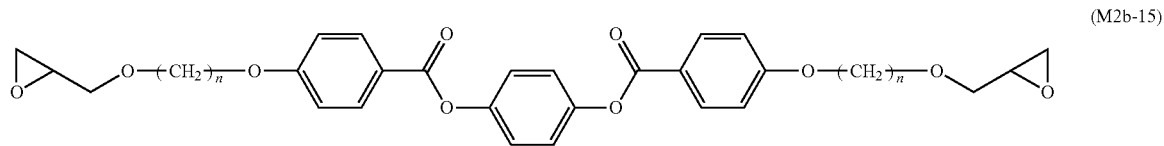
(M2b-15)
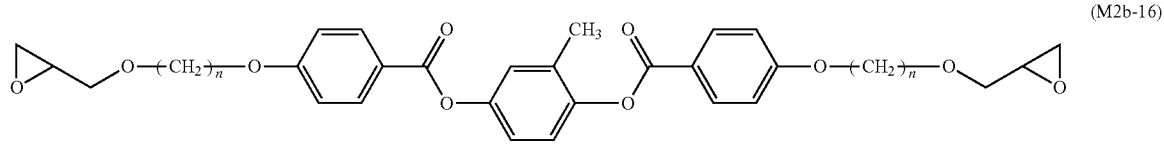
(M2b-16)
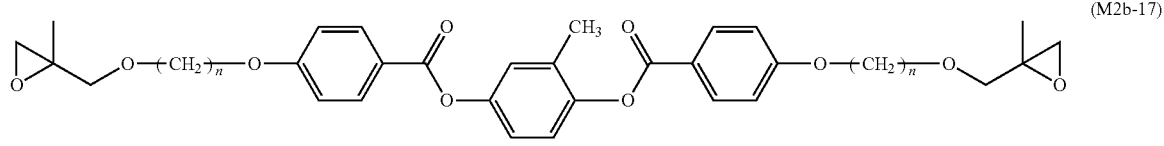
(M2b-17)
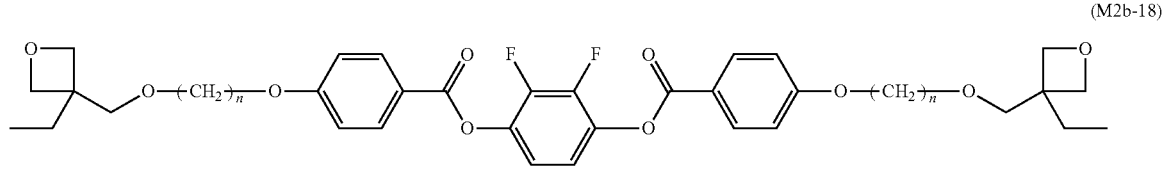
(M2b-18)
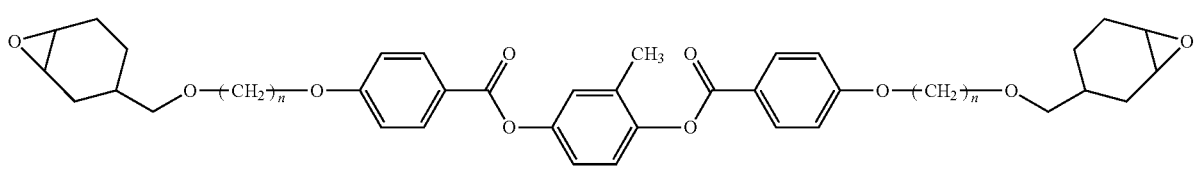
(M2b-19)

Here, n is independently an integer from 0 to 20, preferably, 1 to 15, and further preferably, 2 to 10.
Formula 12
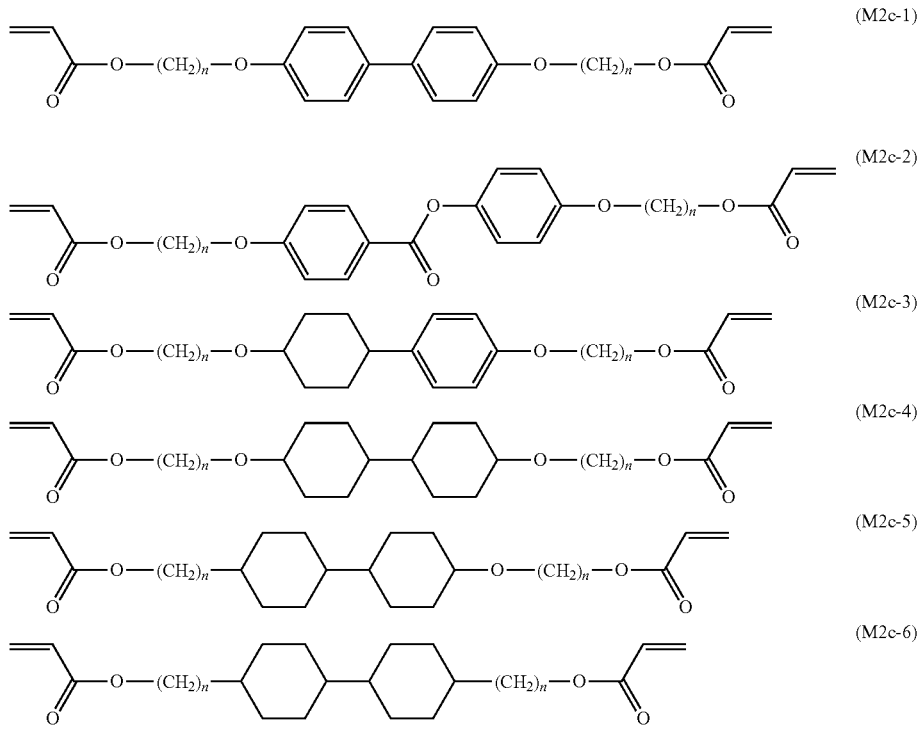
Here, n is independently an integer from 0 to 20, preferably, 1 to 15, and further preferably, 2 to 10.
Formula 13
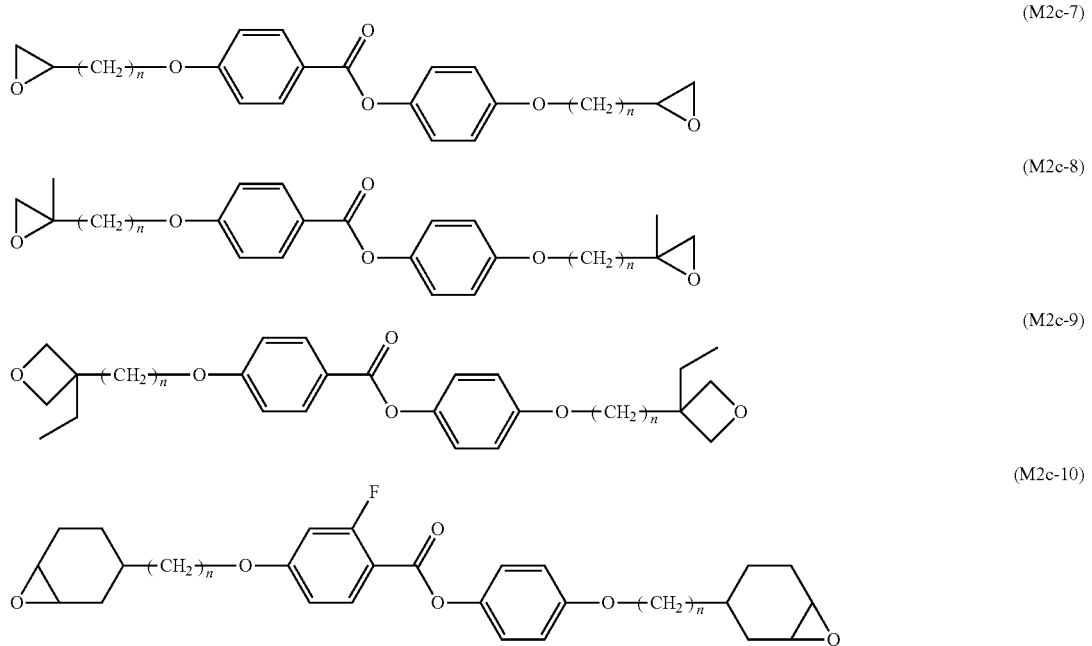

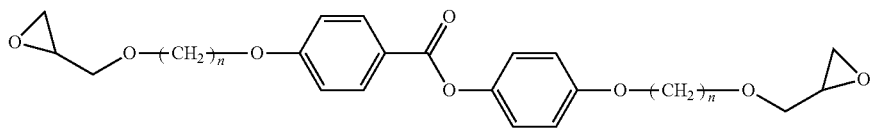

(M2c-11)

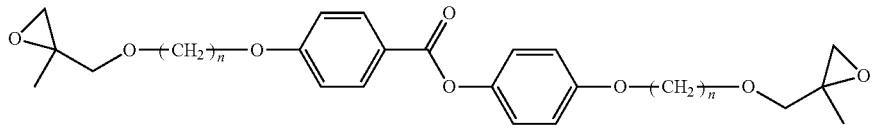

(M2c-12)

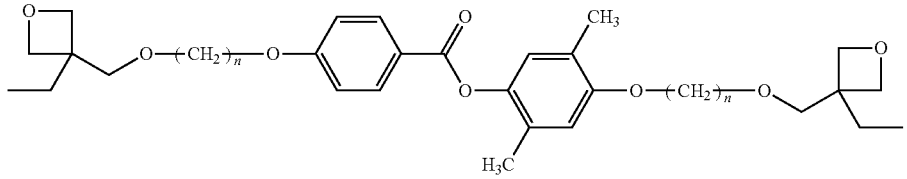

(M2c-13)

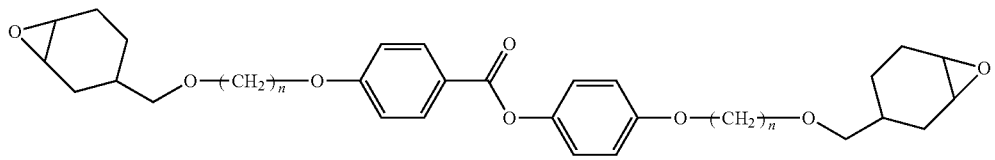

(M2c-14)

Here, n is independently an integer from 0 to 20, preferably, 1 to 15, and further preferably, 2 to 10.

As the polymerizable liquid crystal compound, one kind or two or more kinds described above can be selected and used. Among the compounds described above, a compound selected from (M1a-1) to (M1a-3), (M1a-5) to (M1a-11), (M1a-13) to (M1a-17), (M2a-1) to (M2a-6), (M2a-9), (M2b-2) to (M2b-4), (M2b-6) to (M2b-9), (M2b-12), (M2b-16) to (M2b-17), (M2b-19), (M2c-2) to (M2c-3), (M2c-7) and (M2c-11) is preferred.

The compounds are preferably used, including approximately 10 to approximately 60% by weight of one or more kinds selected from (M1a-1) to (M1a-3), (M1a-5) to (M1a-11) and (M1a-13) to (M1a-17), approximately 0.1 to approximately 60% by weight of one or more kinds selected from (M2a-1) to (M2a-5), approximately 10 to approximately 70% by weight of one or more kinds selected from (M2b-2) to (M2b-4) and (M2b-6) to (M2b-9), and approximately 10 to approximately 50% by weight of one or more kinds selected from (M2c-2) to (M2c-3).

Moreover, the compounds preferably used, including approximately 1 to approximately 60% by weight of one or more kinds selected from (M2a-6) and (M2a-9), approximately 10 to approximately 70% by weight of one or more kinds selected from (M2b-12), (M2b-16) to (M2b-17) and (M2b-19), and approximately 10 to approximately 50% by weight of one or more kinds selected from (M2c-7) and (M2c-11).

The compounds are particularly preferably a combination of (M1a-5), (M1a-7), (M2a-4) and (M2b-2), and are preferably used, including approximately 20 to approximately 30% by weight of (M1a-5), approximately 20 to approximately 30% by weight of (M1a-7), approximately 0.1 to approximately 5% by weight of (M2a-4) and approximately 35 to approximately 45% by weight of (M2b-2).

Moreover, the compounds are particularly preferably a combination of (M2a-6), (M2a-9) and (M2c-7), and preferably used, including approximately 3 to approximately 60% by weight of one or more kinds selected from (M2a-6) and (M2a-9) and approximately 30 to approximately 50% by weight of (M2c-7).

Moreover, bis[4-[4-(acryloyloxy)buthoxycarbonyloxy]benzoic acid]2-methyl-1,4-phenylene (LC-242, made by BASF) can also be preferably exemplified, and LC-242 in combination with one or more kinds selected from the polymerizable liquid crystal compounds described above can also be used.

The polymerizable liquid crystal compound relating to the invention may contain any other polymerizable compound different from the polymerizable liquid crystal compound. Specific examples of a compound having one polymerizable group include styrene, nucleus-substituted styrene, vinyl chloride, vinylidene chloride, N-vinyl pyrrolidone, fatty acid vinyl (example: vinyl acetate), alkyl ester of (meth)acrylic acid (alkyl having 1 to 18 carbons), hydroxyalkyl ester of (meth)acrylic acid (hydroxyalkyl having 1 to 18 carbons), aminoalkyl ester of (meth)acrylic acid (aminoalkyl having 1 to 18 carbons), ether oxygen-containing alkyl ester of (meth)acrylic acid (ether oxygen-containing alkyl having 3 to 18 carbons, examples: methoxyethyl ester, ethoxyethyl ester, methoxypropyl ester, methylcarbyl ester, ethylcarbyl ester and butylcarbyl ester), N-vinylacetamide, vinyl p-t-butylbenzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, dicyclopentaniloxylethyl(meth)acrylate, isobornyloxylethyl(meth)acrylate, isobornyl(meth)acrylate, adamanthyl(meth)acrylate, dimethyladamanthyl(meth)acrylate, dicyclopentanyl(meth)acrylate and dicyclopentenyl(meth)acrylate.

Specific examples of a compound having two polymerizable groups include 1,4-butanediol diacrylate, 1,6-hexanediol diacrylate, 1,9-nonanediol diacrylate, neopentyl glycol diacrylate, dimethyloltricyclodecane diacrylate, triethylene glycol diacrylate, dipropylene glycol diacrylate, tripropylene glycol diacrylate, tetraethylene glycol diacrylate, ethoxylated bisphenol A diacrylate, bisphenol A glycidyl diacrylate (Viscoat V#700) and polyethylene glycol diacrylate, and a methacrylate compound of the compounds. "Viscoat" is a trade name of products made by OSAKA ORGANIC CHEMICAL INDUSTRY LTD. The compounds are suitable for further improving film forming ability of a polymer.

Specific examples of a compound having three or more polymerizable groups include trimethylolpropane tri(meth)acrylate, ethoxylated trimethylol tri(meth)acrylate, tris(meth)acryloyloxyethyl phosphate, tris((meth)acryloyloxyethyl)isocyanurate, alkyl-modified dipentaerythritol tri(meth)acrylate, ethoxylated trimethylolpropane tri(meth)acrylate, propoxylated trimethylolpropane tri(meth)acrylate, pentaerythritol tetra(meth)acrylate, alkyl-modified dipentaerythritol tetra(meth)acrylate, ditrimethylolpropane tetra(meth)acrylate, dipentaerythritol hexa(meth)acrylate, alkyl-modified dipentaerythritol penta(meth)acrylate, Viscoat V#802 (number of functional groups=8) and Viscoat V#1000 (number of functional groups=14). "Viscoat" is a trade name of products made by OSAKA ORGANIC CHEMICAL INDUSTRY LTD. Compounds having 16 or more functional groups are obtained by using Boltorn H20 (16 functional groups), Boltorn H30 (32 functional groups) and Boltorn H40 (64 functional groups) as sold by Perstorp Specialty Chemicals AB as a raw material and acrylating the raw material.

The polymerizable liquid crystal compound used for the invention can contain an additive. Specific examples of the additive include a surfactant, a polymerization initiator, a photosensitizer, a light stabilizer, an ultraviolet light absorber, an antioxidant, a radical scavenger, a chain transfer agent, a coupling agent, a diluent, a reactive diluent, a thixotropic agent (rheology control agent), a colorant, a dye and other auxiliary reagents.

As the surfactant, various compounds can be used, including a silicon surfactant, a fluorine surfactant, a polyether surfactant, an acrylic acid copolymer surfactant, a titanate compound, imidazoline, quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, amine lauryl sulfate, alkyl-substituted aromatic sulfonate, alkyl phosphate, aliphatic or aromatic sulfonic acid formalin condensate, laurylamidopropyl betaine, laurylaminoacetic betaine, polyethylene glycol fatty acid ester, polyoxyethylene alkylamine, perfluoroalkyl sulfonate, perfluoroalkyl carboxylate, an oligomer having a perfluoroalkyl group and a hydrophilic group, an oligomer having a perfluoroalkyl group and an oleophilic group, urethane having a perfluoroalkyl group, polyester-modified polydimethylsiloxane having a hydroxyl group, polyester polyether-modified polydimethylsiloxane having a hydroxyl group, polyether-modified polydimethylsiloxane having a hydroxyl group and polyester-modified polyalkylsiloxane. The surfactant is effective in facilitating application of the polymerizable liquid crystal composition onto the support substrate, or the like. As the surfactant, a commercial item can also be used. Specific examples include BYK-361N (trade name, made by BYK Japan KK), FTX-218 (trade name, Neos Corporation) and Polyflow No. 77 (trade name, KYOEISHA CHEMICAL Co., Ltd.). A preferred ratio of the surfactant is different depending on a kind of the surfactant, a composition ratio of the polymerizable liquid crystal compound or the like, but is approximately 0.01 to approximately 5 parts by weight, and further preferably, approximately 0.1 to approximately 3 parts by weight, based on 100 parts by weight of the polymerizable liquid crystal compound.

A publicly known photopolymerization initiator may be used for optimizing a polymerization rate of the polymerizable liquid crystal compound. A preferred amount of addition of the photopolymerization initiator is approximately 0.01 to approximately 20 parts by weight based on 100 parts by weight of the polymerizable liquid crystal compound. A further preferred range in the weight ratio is approximately 0.1 to approximately 15 parts by weight. A still further preferred range is approximately 1 to approximately 15 parts by weight. Specific examples of the photopolymerization initiator include 2-hydroxy-2-methyl-1-phenylpropane-1-one (Darocur (registered trademark) 1173), 1-hydroxycyclohexylphenyl ketone, 2,2-dimethoxy-1,2-diphenylethane-1-one (Irgacure (registered trademark) 651), 1-hydroxy-cyclohexyl-phenyl-ketone (Irgacure 184), Irgacure 250, Irgacure 127. Irgacure 500 (mixture of Irgacure 184 and benzophenone), Irgacure 2959, Irgacure 907, Irgacure 369, Irgacure 379, Irgacure 754, Irgacure 1300, Irgacure 819, Irgacure 1700, Irgacure 1800, Irgacure 1850, Irgacure 1870, Darocur 4265, Darocur MBF, Darocur TPO, Irgacure 784, Irgacure 754, Irgacure OXE01 and Irgacure OXE02. Both of Darocur and Irgacure described above are names of products currently sold by BASF Japan, Ltd. To the products, a publicly known sensitizer (isopropylthioxanthone, diethylthioxanthone, ethyl-4-dimethylaminobenzoate (Darocur EDB), 2-ethylhexyl-4-dimethylaminobenzoate (Darocur EHA) or the like) may be added.

Other specific examples of the photoradical polymerization initiator include p-methoxyphenyl-2,4-bis(trichloromethyl)triazine, 2-(p-butoxystyryl)-5-trichloromethyl-1,3,4-oxadiazole, 9-phenylacridine, 9,10-benzophenazine, a benzophenone/Michler's ketone mixture, a hexaarylbiimidazole/mercaptobenzimidazole mixture, 1-(4-isopropylphenyl)-2-hydroxy-2-methylpropane-1-one, benzyldimethyl ketal, 2-methyl-1-[4-(methylthio)phenyl]-2-morpholinopropane-1-one, a 2,4-diethylxanthone/p-methyl-dimethylaminobenzoate mixture and a benzophenone/methyltriethanolamine mixture.

One kind or two or more kinds of chain transfer agents are added to the polymerizable liquid crystal composition to allow control of mechanical characteristic of a polymer. Use of the chain transfer agent allows control of a length of a polymer chain or a length of two crosslinked polymer chains in a polymer film. Use also allows simultaneous control of the lengths. An increase in an amount of the chain transfer agent causes a decrease in the length of the polymer. A preferred chain transfer agent is a thiol compound. Specific examples of monofunctional thiol include dodecanethiol and 2-ethylhexyl-(3-mercaptopropionate). Specific examples of polyfunctional thiol include trimethylolpropanetris-(3-mercaptopropionate), pentaerythritol tetrakis(3-mercaptopropionate), 1,4-bis(3-mercaptobutyryloxy)butane (Karenz MT BD1), pentaerythritol tetrakis(3-mercaptobutyrate) (Karenz MT PE1) and 1,3,5-tris(3-mercaptobutyloxyethyl)-1,3,5-triazine-2,4,6(1H,3H,5H)-trione (Karenz MT NR1). "Karenz" is a trade name of products made by Showa Denko K.K., and is a registered trademark.

A polymerization inhibitor can be added to the polymerizable liquid crystal composition to prevent polymerization start during storage. A publicly known polymerization inhibitor can be used. Preferred examples include 2,5-di(t-butyl)hydroxytoluene (BHT), hydroquinone, Methyl Blue, diphenylpicric acid hydrazide (DPPH), benzothiazine, 4-nitrosodimethylaniline (NIDI) and o-hydroxybenzophenone.

An oxygen inhibitor can also be added to improve storage stability of the polymerizable liquid crystal composition. A radical generated in a composition reacts with oxygen in atmosphere to give a peroxide radical, and an unwanted reaction with the polymerizable compound is promoted. For the purpose of preventing such a reaction, the oxygen inhibitor is preferably added. Specific examples of the oxygen inhibitor include phosphate ester.

In order to further improve weather resistance of the polymerizable liquid crystal composition, the ultraviolet light absorber, the light stabilizer (radical scavenger), the antioxidant or the like may be added. Specific examples of the ultraviolet light absorber include TINUVIN PS, TINUVIN P, TINUVIN 99-2, TINUVIN 109, TINUVIN 213, TINUVIN 234, TINUVIN 326, TINUVIN 328, TINUVIN 329, TINUVIN 384-2, TINUVIN 571, TINUVIN 900, TINUVIN 928, TINUVIN 1130, TINUVIN 400, TINUVIN 405, TINUVIN 460, TINUVIN 479, TINUVIN 5236, ADK STAB LA-32, ADK STAB LA-34, ADK STAB LA-36, ADK STAB LA-31, ADK STAB 1413 and ADK STAB LA-51. "TINUVIN" is a trade name of products made by BASF Japan, Ltd. Moreover, "ADK STAB" is a trade name and a registered trademark of products made by ADEKA Corporation.

Specific examples of the light stabilizer include TINUVIN 111FDL, TINUVIN 123, TINUVIN 144, TINUVIN 152, TINUVIN 292, TINUVIN 622, TINUVIN 770, TINUVIN 765, TINUVIN 780, TINUVIN 905, TINUVIN 5100, TINUVIN 5050, TINUVIN 5060, TINUVIN 5151, CHIMASSORB 119FL, CHIMASSORB 944FL, CHIMASSORB 944LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, CYASORB UV-3346 made by Nihon Cytec Industries Inc., and GOODRITE UV-3034 of Goodrich Corporation. "CHIMASSORB" is a trade name and a registered trademark of products made by BASF Japan Ltd.

Specific examples of the antioxidant include ADK STAB AO-20, AO-30, AO-40, AO-50, AO-60 and AO-80 made by ADEKA Corporation, SUMILIZER BHT, SUMILIZER BBM-S and SUMILIZER GA-80 sold by Sumitomo Chemical Co., Ltd., and Irganox 1076, Irganox 1010, Irganox 3114 and Irganox 245 sold by BASF Japan, Ltd. The commercial items described above may be used.

A silane coupling agent may further be added to the polymerizable liquid crystal compound to control adhesion with the alignment layer in the range within an effect of the antistripping additive is not adversely affected. Specific examples include vinyltrialkoxysilane, 3-aminopropyltrialkoxysilane, N-(2-aminoethyl)-3-aminopropyltrialkoxysilane, 3-glycidoxypropyltrialkoxysilane, 3-chlorotrialkoxysilane and 3-methacryloxypropyltrialkoxysilane. Another example includes dialkoxymethylsilane in which one of alkoxy groups (three) is replaced by a methyl group in the compounds. A preferred silane coupling agent is 3-aminopropyltriethoxysilane.

The polymerizable liquid crystal compound used in the invention can be applied as it is. However, in order to facilitate application, the polymerizable liquid crystal compound may be diluted with a solvent as long as the solvent erodes neither the support substrate nor the alignment layer. The organic solvent is useful for forming a coating film having a uniform thickness. After application, heating is made to remove the solvent, thereby obtaining the coating film having the uniform thickness of the polymerizable liquid crystal compound. The solvent can be used alone or may be used in combination of two or more. Specific examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (methyl propionate, methyl 3-methoxypropionate, ethyl propionate, propyl propionate and butyl propionate), alkyl butyrate (methyl butyrate, ethyl butyrate, butyl butyrate, isobutyl butyrate and propyl butyrate), dialkyl malonate (diethyl malonate), alkyl glycolate (methyl glycolate and ethyl glycolate), alkyl lactate (methyl lactate, ethyl lactate, isopropyl lactate, n-propyl lactate, butyl lactate and ethylhexyl lactate), monoacetin, γ-butyrolactone and γ-valerolactone.

Preferred examples of the amide solvent include N-methyl-2-pyrrolidone, N,N-dimethylacetamide, N-methylpropionamide, N,N-dimethylformamide, N,N-diethylformamide, N,N-diethylacetamide, N,N-dimethylacetamide dimethyl acetal, N-methylcaprolactam and dimethylimidazolidinone.

Preferred examples of the alcohol solvent include methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexandiol, 3-methyl-3-methoxybutanol, cyclohexanol and methyl cyclohexanol.

Preferred examples of the ether solvent include ethylene glycol dimethyl ether, diethylene glycol dimethyl ether, bis(2-propyl)ether, 1,4-dioxane and tetrahydrofuran (THF).

Preferred examples of the glycol monoalkyl ether solvent include ethylene glycol monoalkyl ether (ethylene glycol monomethyl ether and ethylene glycol monobutyl ether), diethylene glycol monoalkyl ether (diethylene glycol monoethyl ether), triethylene glycol monoalkyl ether, propylene glycol monoalkyl ether (propylene glycol monobutyl ether), dipropylene glycol monoalkyl ether (dipropylene glycol monomethyl ether), ethylene glycol monoalkyl ether acetate (ethylene glycol monobutyl ether acetate), diethylene glycol monoalkyl ether acetate (diethylene glycol monoethyl ether acetate), triethylene glycol monoalkyl ether acetate, propylene glycol monoalkyl ether acetate (propylene glycol monomethyl ether acetate, propylene glycol monoethyl ether acetate and propylene glycol monobutyl ether acetate), dipropylene glycol monoalkyl ether acetate (dipropylene glycol monomethyl ether acetate) and diethylene glycol methyl ethyl ether.

Preferred examples of the aromatic hydrocarbon solvent include benzene, toluene, xylene, anisole, p-cymene, mesitylene, ethylbenzene, diethylbenzene, i-propylbenzene, n-propylbenzene, t-butylbenzene, s-butylbenzene, n-butylbenzene and tetralin. Preferred examples of the halogenated aromatic hydrocarbon solvent include chlorobenzene. Preferred examples of aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Preferred examples of the alicyclic hydrocarbon solvent include cyclohexane and decalin.

Preferred examples of the ketone solvent include acetone, methyl ethyl ketone, methyl isobutyl ketone, cyclohexanone, cyclopentanone and methyl propyl ketone.

Preferred examples of the acetate solvent include ethylene glycol monomethyl ether acetate, propylene glycol monomethyl ether acetate, propylene glycol monoethyl ether acetate, methyl acetoacetate and 1-methoxy-2-propyl acetate.

Use of the amide solvent, the aromatic hydrocarbon solvent or the ketone solvent is preferred from a viewpoint of solubility of the polymerizable liquid crystal compound. When a boiling point of the solvent is taken into consideration, combined use of the ester solvent, the alcohol solvent, the ether solvent and the glycol monoalkyl ether solvent is also preferred. Solvent selection is not particularly limited, but when a plastic substrate is used as the support substrate, reduction of drying temperature is required to prevent deformation of the support substrate band prevention of erosion of the support substrate by the solvent is required. Specific examples of the solvent preferably used in such a case include an aromatic hydrocarbon solvent, a ketone solvent, an ester solvent, an ether solvent, an alcohol solvent, an acetate solvent and a glycol monoalkyl ether solvent.

A ratio of the solvent in a solution of the polymerizable liquid crystal compound is approximately 0 to approximately 95% by weight based on the total weight of the solution. A lower limit of the range is a numerical value determined in consideration of a case where the support substrate is eroded by the solvent. Then, an upper limit is a numerical value determined in consideration of solution viscosity, solvent cost and productivity such as time and an amount of heat upon evaporating the solvent. A preferred range of the ratio is approximately 0 to approximately 90% by weight, and a further preferred range is approximately 0 to approximately 85% by weight.

The film (retardation film) of the invention is formed as described below.

An alignment layer is formed on a support substrate, and applied with a mixture of a polymerizable liquid crystal compound and an antistripping additive or a solution of the mixture and dried to form a coating film (polymerizable liquid crystal composition layer). Next, the coating film is irradiated with light to polymerize the polymerizable liquid crystal compound to immobilize nematic alignment formed by the composition in the coating film in a liquid crystal state. In the invention, the liquid crystal composition layer is obtained by immobilizing the alignment of the polymerizable liquid crystal compound contained in the polymerizable liquid crystal composition layer. The liquid crystal composition layer may be arranged in one layer, and also in two or more layers.

The retardation film may be patterned. The patterned retardation film is formed as described below.

In a first method of formation, an alignment layer formed on a support substrate is subjected to patterning treatment, and applied with a mixture of a polymerizable liquid crystal compound and an antistripping additive or a solution of the mixture, and dried to form a coating film. Next, the coating film is irradiated with light to polymerize the polymerizable liquid crystal compound to immobilize nematic alignment formed by the composition in the coating film in a liquid crystal state.

In a second method of formation, an alignment layer formed on a support substrate is subjected to uniform alignment treatment, and applied with a mixture of a polymerizable liquid crystal compound and an antistripping additive or a solution of the mixture, and dried to form a coating film. Next, a polymerizable liquid crystal composition layer subjected to alignment treatment in an identical direction is irradiated with light through a photomask to polymerize the polymerizable liquid crystal compound to immobilize nematic alignment. Here, an unirradiated region is removed with a solvent.

In a third method of formation, an alignment layer formed on a support substrate is subjected to uniform alignment treatment, and applied with a mixture of a polymerizable liquid crystal compound and an antistripping additive or a solution of the mixture, and dried to form a coating film. Next, a polymerizable liquid crystal composition layer subjected to alignment treatment in an identical direction is irradiated with light through a photomask to polymerize the polymerizable liquid crystal compound to immobilize nematic alignment. Here, in a state in which an unirradiated region is changed to an isotropic phase in which a liquid crystal phase is not developed by heating, the polymerizable liquid crystal compound is polymerized with light or heat.

A support substrate that can be used is a glass plate and a plastic film. Specific examples of the plastic film include a film of polyimide, polyamideimide, polyamide, polyether imide, polyetherether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, acrylic resin, polyvinyl alcohol, polypropylene, cellulose, triacetyl cellulose and a partially saponified product thereof, an epoxy resin, a phenol resin and a cycloolefin resin. Among the plastics, triacetyl cellulose, polyethylene terephthalate, a phenol resin, a cycloolefin resin and so forth are preferred.

Specific examples of the cycloolefin resin include a norbornene resin and a dicyclopentadiene resin, but are not limited thereto. In the resins described above, a resin having no unsaturated bond or having an unsaturated bond hydrogenated is suitably used. Specific examples include a hydrogenated product of a ring opening (co)polymer of one kind or two or more kinds of norbornene monomers, an addition (co)polymer of one kind or two or more kinds of norbornene monomers, an addition copolymer of a norbornene monomer and an olefin monomer (ethylene, α-olefin), an addition copolymer of a norbornene monomer and a cycloolefin monomer (cyclopentene, cyclooctene, 5,6-dihydrodicyclopentadiene) and a modified product thereof. Specific examples include ZEONEX (trade name, registered trademark) and ZEONOR (trade name, registered trademark, made by ZEON CORPORATION), ARTON (trade name, made by JSR Corporation), TOPAS (trade name, made by Ticona GmbH), APEL (trade name, made by Mitsui Chemicals, Inc.), S-SINA (trade name, registered trademark, made by Sekisui Chemical Co., Ltd.) and OPTOREZ (trade name, made by Hitachi Chemical Co., Ltd.).

The plastic film may be a uniaxially oriented film or a biaxially oriented film. The plastic film may be subjected to, for example, hydrophilization treatment such as corona treatment or plasma treatment, or surface treatment such as hydrophobization treatment. A method for hydrophilization treatment is not particularly limited, but corona treatment or plasma treatment is preferred, and a particularly preferred method is plasma treatment. For the plasma treatment, a method described in JP 2002-226616 A, JP 2002-121648 A or the like may be applied. Moreover, an anchor coat layer may be formed for improving adhesion between a liquid crystal film and a plastic film. Such an anchor coat layer may be formed of any of an inorganic material or an organic material as long as the material improves adhesion between the plastic film with the alignment layer or the patterned retardation film. Moreover, the plastic film may be a laminated film. In place of the plastic film, a material can also be used, such as a metallic substrate of aluminum, iron or copper on a surface of which slit-shaped grooves are formed, and a glass substrate of alkaline glass, borosilicate glass or flint glass to a surface of which etching processing is applied in a slit shape.

Prior to formation of the coating film of a mixture of the polymerizable liquid crystal compound and the antistripping additive, physical or mechanical surface treatment by rubbing or the like may be applied to the support substrate such as the glass plate and the plastic film. When homeotropic alignment is applied to part of the patterned retardation film, surface treatment such as rubbing is not applied in many cases, but the rubbing treatment may be applied to prevent an alignment defect or the like. An arbitrary method may be applied to the rubbing treatment, but a method is ordinarily applied by winding a rubbing fabric formed of a raw material such as rayon, cotton and polyamide around a metallic roll or the like to move the roll while rotating the roll in a state in contact with a support substrate or an alignment layer, or moving a support substrate side while fixing the roll. The rubbing treatment may be directly applied to the support substrate, or an alignment layer is preliminarily arranged on a support substrate, and then the rubbing treatment may be applied to the alignment layer. A method for rubbing treatment is as described above. Depending on a kind of the support substrate, silicon oxide is obliquely vapor-deposited to allow provision of alignment ability on a surface thereof.

Upon applying the mixture of the polymerizable liquid crystal compound and the antistripping additive or the solution of the mixture, specific examples of an application method for obtaining a uniform thickness include a spin coating method, a micro gravure coating method, a gravure coating method, a wire bar coating method, a dip coating method, a spray coating method, a meniscus coating method and a die coating method. The wire bar coating method or the like in which shear stress is applied to the liquid crystal compound during application may be applied in controlling alignment of the polymerizable liquid crystal compound without performing surface treatment of the support substrate according rubbing or the like.

Upon applying the polymerizable liquid crystal compound and the antistripping additive or the mixture thereof, a solvent is added in some cases. A mixture containing at least the polymerizable liquid crystal compound, the antistripping additive and the solvent according to the invention is generically expressed as a solution of the polymerizable liquid crystal composition. A combination described below is expressed in a similar manner:

a combination of a polymerizable liquid crystal compound and an antistripping additive, an additive, a solvent and any other polymerizable compound; and a combination of a polymerizable liquid crystal compound and an antistripping additive, an additive and a solvent.

In addition, a combination of at least the polymerizable liquid crystal compound and the antistripping additive, more specifically, a case where no solvent is contained, is expressed as a polymerizable liquid crystal composition. For example, the polymerizable liquid crystal composition includes a case of the polymerizable liquid crystal compound and the antistripping additive, the additive and any other polymerizable compound.

Upon applying the solution of the polymerizable liquid crystal composition, the solvent is removed after application to form a polymerizable liquid crystal composition layer having a uniform thickness, namely, a layer formed of the polymerizable liquid crystal composition, on the support substrate. A condition of solvent removal is not particularly limited. The condition only needs drying until most of the solvent is removed to lose flowability of a coating film formed of the polymerizable liquid crystal composition. The solvent can be removed using air drying at room temperature, drying on a hot plate, drying in a drying oven, blowing of warm air or hot air, or the like. Depending on a kind and a composition ratio of the polymerizable liquid crystal compound, nematic alignment in the coating film may be occasionally completed in a process of drying the coating film. Therefore, the coating film through a drying step can be supplied to a polymerization step without passing through a heat treatment step described later.

A preferred range of temperature and time upon applying heat treating to the coating film, wavelength of light used for irradiation with light and an amount of light to be irradiated from a light source is different depending on a kind and a composition ratio of the polymerizable liquid crystal compound, presence or absence of addition of the polymerization initiator and an amount of addition thereof, or the like. Therefore, conditions of the temperature and the time of heat treatment of the coating film, the wavelength of light used for irradiation with light, and the amount of light to be irradiated from the light source explained below represents only an approximate range.

The heat treatment of the coating film is preferably applied on conditions under which the solvent is removed and uniform alignment properties of the polymerizable liquid crystal compound are obtained. The heat treatment may be applied at a temperature not less than a liquid crystal phase transition temperature of the polymerizable liquid crystal compound. One example of the heat treatment method includes a method for warming a coating film to a temperature at which the polymerizable liquid crystal compound shows a nematic liquid crystal phase to form nematic alignment in the polymerizable liquid crystal compound in the coating film. The nematic alignment may be formed by changing the temperature of the coating film in a temperature range in which the polymerizable liquid crystal compound shows the nematic liquid crystal phase. The above method includes a method for warming a coating film to a high temperature region of the temperature range described above, thereby almost competing nematic alignment in the coating film, and then decreasing temperature to form further-ordered alignment. When any one of the heat treatment method described above is applied, the heat treatment temperature is ordinarily approximately 25° C. to approximately 120° C. A preferred temperature range is approximately 25° C. to approximately 100° C., a further preferred range is approximately 25° C. to approximately 90° C., and a still further preferred range is approximately 25° C. to approximately 80° C. Heat treatment time is ordinarily approximately 5 seconds to approximately 2 hours. A preferred range of time is approximately 10 seconds to approximately 40 minutes, and a further preferred range is approximately 20 seconds to approximately 20 minutes. In order to raise the temperature of the polymerizable liquid crystal composition layer to a predetermined temperature, the heat treatment time is preferably adjusted to be approximately 5 seconds or more. In order to avoid reduction of productivity, the heat treatment time is preferably adjusted within approximately 2 hours. Thus, the polymerizable liquid crystal composition layer of the invention is obtained.

The nematic alignment state of the polymerizable liquid crystal compound as formed in the polymerizable liquid crystal composition layer is immobilized by polymerization of the polymerizable liquid crystal compound by irradiation with light. A wavelength of light used for irradiation with light is not particularly limited. Electron beams, ultraviolet light, visible light, infrared light (heat rays) or the like can be used. Ordinarily, ultraviolet light or visible light is sufficient used. A range of wavelength is ordinarily approximately 150 to approximately 500 nanometers. A preferred range is approximately 250 to approximately 450 nanometers, and a further preferred range is approximately 300 to approximately 400 nanometers. Specific examples of the light source include a low-pressure mercury lamp (a germicidal lamp, a fluorescence chemical lamp, a black light), a high-pressure discharge lamp (a high-pressure mercury lamp, a metal halide lamp) and a short arc discharge lamp (an ultrahigh pressure mercury lamp, a xenon lamp and a mercury xenon lamp). Preferred examples of the light source include a metal halide lamp, a xenon lamp, an ultrahigh pressure mercury lamp and a high-pressure mercury lamp. A wavelength region of the light source for irradiation may be selected by installing a filter or the like between the light source and the polymerizable liquid crystal composition layer to allow only a specific wavelength region to pass therethrough. An amount of light to be irradiated from the light source is ordinarily approximately 2 to approximately 5,000 mJ/cm$^2$. A preferred range of the amount of light is approximately 10 to approximately 3,000 mJ/cm$^2$, and a further preferred range is approximately 100 to approximately 2,000 mJ/cm$^2$. A temperature condition during irradiation with light is preferably set up in a manner similar to the condition of the heat treatment temperature described above. Moreover, an atmosphere of a polymerization environment may include any of a nitrogen atmosphere, an inert gas atmosphere and an air atmosphere, but a nitrogen atmosphere or an inert gas atmosphere is preferred from a viewpoint of improving curability.

When the polymerizable liquid crystal composition layer and the patterned retardation film (liquid crystal film) obtained by polymerizing the layer with light, heat or the like are used for various optical devices or applied as an optical compensation device used for a liquid crystal display apparatus, control of tilt angle distribution in a thickness direction becomes very important.

One of the methods for controlling the tilt angle includes a method for adjusting a kind, a composition ratio or the like of the polymerizable liquid crystal compound. The tilt angle can also be controlled by adding any other component to the polymerizable liquid crystal compound. Moreover, the tilt angle can be controlled by a kind of the solvent, a solute concentration, a kind and an amount of addition of a surfactant to be added as one of other components, or the like. The tilt angle can also be controlled by a kind of support substrate, a kind and an alignment treatment condition of the alignment layer, a drying condition, a heat treatment condition or the like of the coating film formed of the mixture of the polymerizable liquid crystal compound and the antistripping additive. Furthermore, an irradiation atmosphere, a temperature during irradiation or the like in a photopolymerization step after alignment also influences the tilt angle. More specifically, almost all the conditions in the process of manufacturing the patterned retardation film may be considered to have some influence on the tilt angle. Therefore, an arbitrary tilt angle can be achieved by optimizing the polymerizable liquid crystal compound and also by appropriately selecting conditions of the process of manufacturing the patterned retardation film. In the invention, the alignment state of the liquid crystal composition layer is applied in homogeneous alignment.

When the alignment layer is formed on the support substrate in order to form the homogeneous alignment, control of an alignment direction is needed. As a method for controlling the alignment direction of the polymerizable liquid crystal compound, a rubbing method, a photoalignment treatment method, a nanoimprinting method, an orientation method or the like is applied.

When the rubbing method is applied, an alignment film of a polyimide or polyvinyl alcohol material is used in the form of the alignment layer. When the photoalignment treatment method is applied, a photoalignment film containing as a main component a (meth)acrylate polymer, a cycloolefin polymer, a siloxane polymer or the like is used in the form of the alignment layer. When the photoalignment film is used, a site having photosensitivity is necessary for polymer structure. In order to align the polymerizable liquid crystal compound, a photoisomerization polymer in which a photosensitive site is an azo site, a photodimerization polymer having a cinnamate site or a chalcone site, or a photolysis polymer having a cyclobutane site is preferred, and from a viewpoint of sensitivity, a photodimerization polymer is used further preferred.

As the photodimerization polymer, a (meth)acrylate polymer, a cycloolefin polymer, a siloxane polymer or the like is preferred, and a (meth)acrylate polymer or cycloolefin polymer having, in a polymer side chain, cinnamate structure or chalcone structure as the photodimerization site is preferably used.

In the invention, the alignment layer preferably includes the (meth)acrylate polymer from a viewpoint of adhesion and durability. A ratio that the (meth)acrylate polymer in the polymers used for the alignment layer is preferably approximately 30 to approximately 100% by weight, and further preferably, approximately 50 to approximately 100% by weight. The alignment layer particularly preferably includes the (meth)acrylate polymer.

When the alignment layer includes the (meth)acrylate polymer, in addition to the (meth)acrylate polymer, a compound may also be used, such as an itaconic acid derivative, vinyl ether, styrene or a derivative thereof, vinyl ester, maleimide or a derivative thereof, an allyl compound or a derivative thereof, acrylonitrile or a derivative thereof and any other vinyl monomer. Any other monomer described above may be used alone or in combination with two or more kinds.

A cyclic ether composition or the like has been known so far as a composition that is homogeneously aligned and has good adhesion. On the other hand, the present inventors have found that adhesion is improved by adding a specific antistripping additive described above in the (meth)acrylic polymer that has been deemed so far to be inferior in adhesion and durability. Furthermore, any of the (meth) acrylic polymer may be used as long as the polymer itself has a composition that is homogeneously aligned, and adhesion of the antistripping additive allows improvement in adhesion without disturbing the alignment.

The monomer used for formation of the (meth)acrylate polymer preferably includes photodimerizable or photoisomerizable structure as the photosensitive site (hereinafter, the monomer is also referred to as photoalignable monomer). Specific examples of the photodimerizable structure (photoalignable group) include cinnamate structure (structure derived from a cinnamate group) and chalcone structure (structure derived from chalcone). Specific examples of the photoisomerizable structure include an azo group.

For the (meth)acrylate polymer, a homopolymer of the photoalignable monomer or a copolymer of the photoalignable monomer and any other non-photodimerizable (non-photoalignable) (meth)acrylic monomer is preferably used.

Specific examples of the monomer having the photoalignable group to be used for formation of the (meth)acrylate polymer include a monomer forming a constitutional unit represented by formula (I-1-1), (I-2-1) or (I-3-1). Such a monomer can be obtained by a publicly known method.

—OCO—, o represents an integer from 2 to 6, p represents an integer from 0 to 2, and q represents 0 or 1, w is a molar fraction and meets a relation: w<1, and at least one hydrogen of a phenylene group may be replaced by fluorine, a methyl group or a methoxy group.)

Formula 15

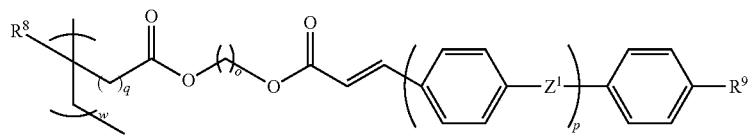
(II)

Formula 14

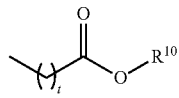

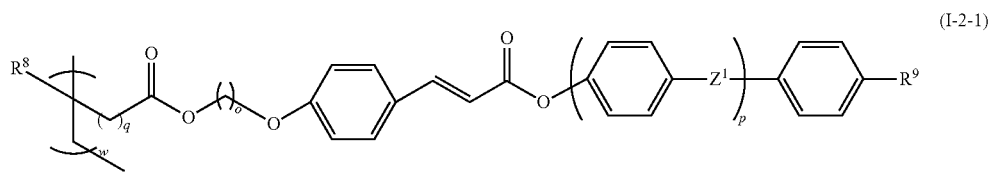
(I-1-1)

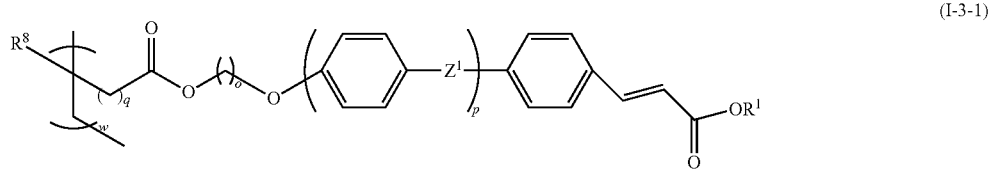
(I-2-1)

(I-3-1)

(wherein, in the formula, $R^1$ represents hydrogen or an alkyl group having 1 to 20 carbons in which arbitrary hydrogen may be replaced by fluorine, $R^8$ represents hydrogen, a methyl group or a group represented by formula (II) described below, $R^9$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $Z^1$ represents a single bond, —COO— or (wherein, in the formula, $R^{19}$ represents hydrogen or a methyl group, and t represents 0 or 1.)

Specific examples of the photoalignable monomer forming the constitutional unit of formula (I-1-1) described above include a monomer represented by formula (I-1-1-a) to (I-1-1-l) and formula (I-1-1-m) to (I-1-1-x) described below (wherein, in the formula, $R^{11}$ represents hydrogen or a methyl group, and $R^{12}$ represents an alkyl group having 1 to 10 carbons).

Formula 16
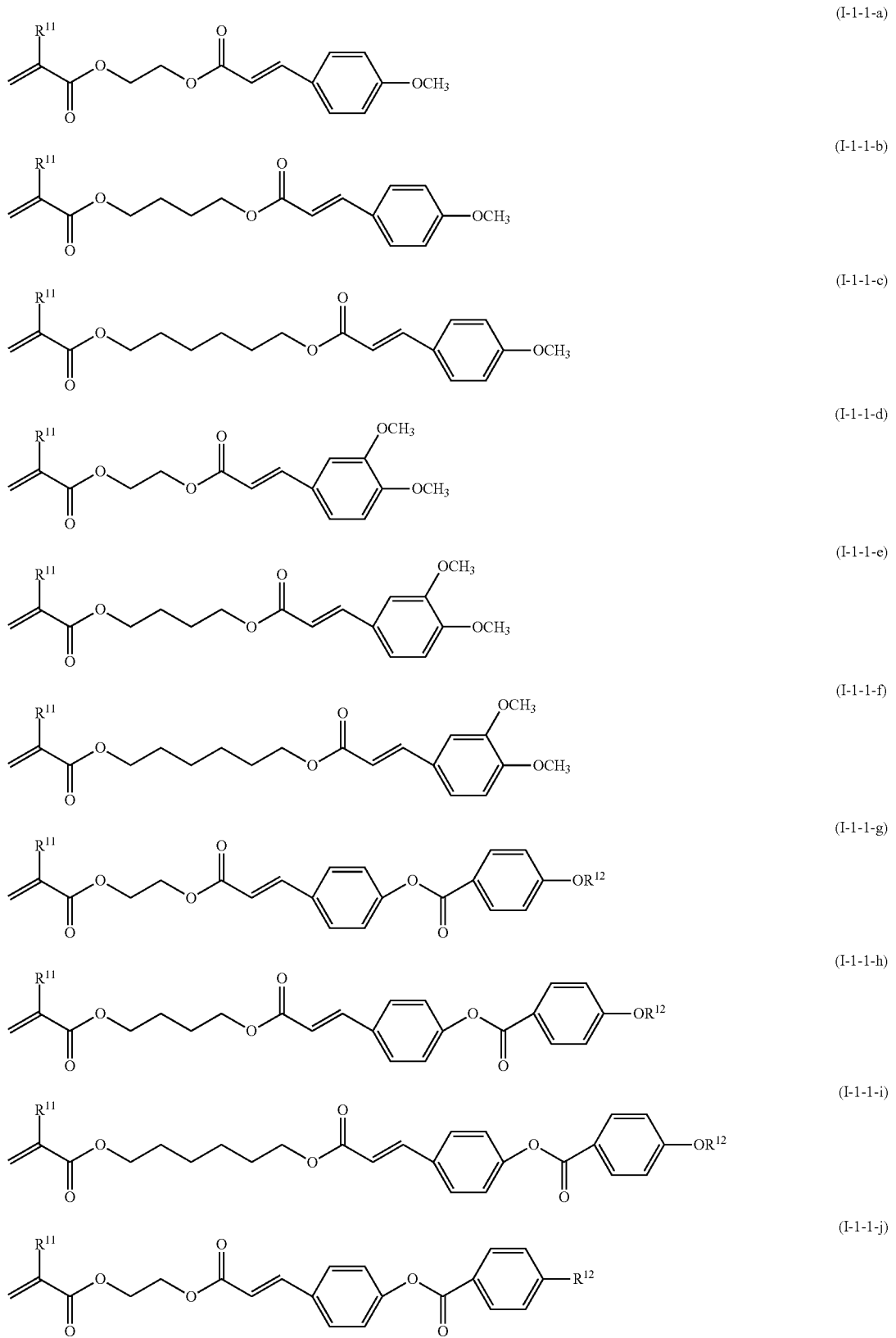

-continued
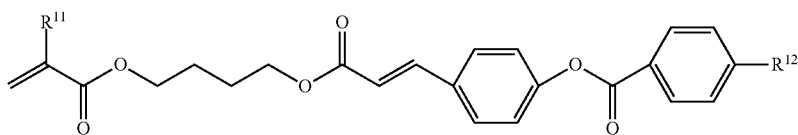
(I-1-1-k)
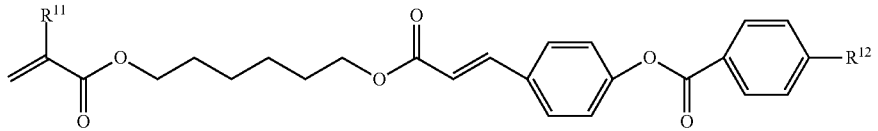
(I-1-1-l)
Formula 17
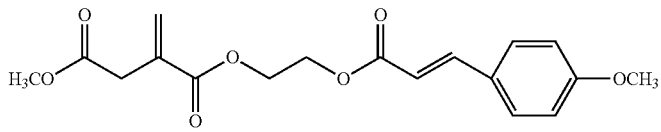
(I-1-1-m)
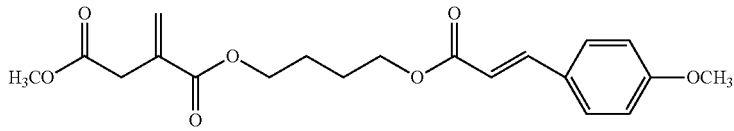
(I-1-1-n)
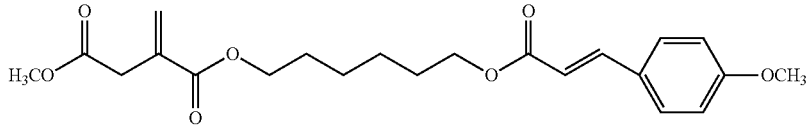
(I-1-1-o)
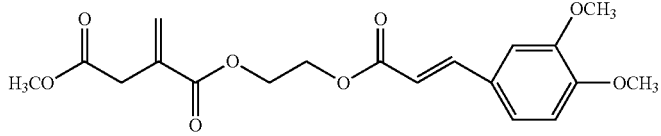
(I-1-1-p)
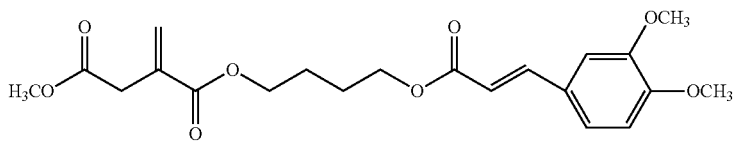
(I-1-1-q)
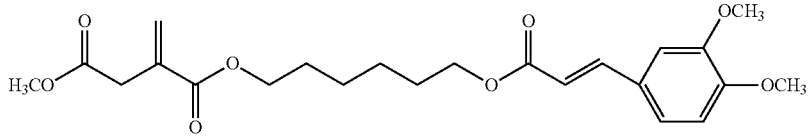
(I-1-1-r)
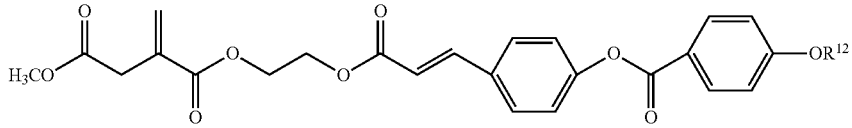
(I-1-1-s)
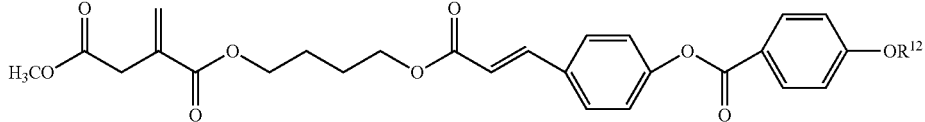
(I-1-1-t)
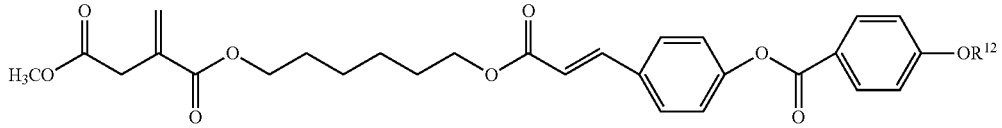
(I-1-1-u)

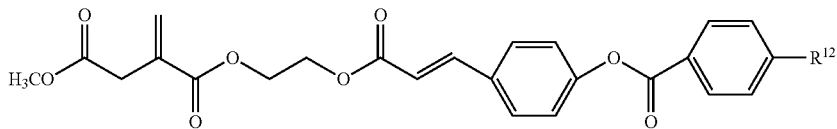
(I-1-1-v)

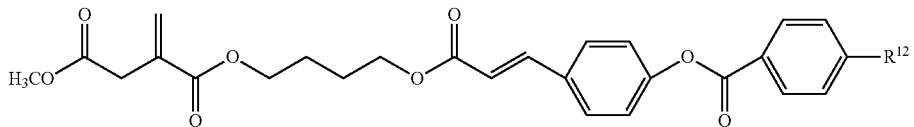
(I-1-1-w)

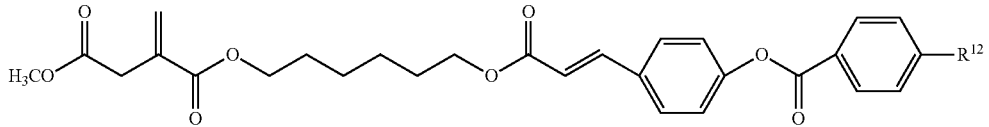
(I-1-1-x)

Specific examples of the photoalignable monomer forming the constitutional unit represented by formula (I-2-1) described above include a monomer represented by formulas (I-2-1-a) to (I-2-1-l) and formulas (I-2-1-m) to (I-2-1-x) described below (wherein, in the formula, $R^{11}$ represents hydrogen or a methyl group, and $R^{12}$ represents hydrogen or an alkyl group having 1 to 10 carbons).

Formula 18

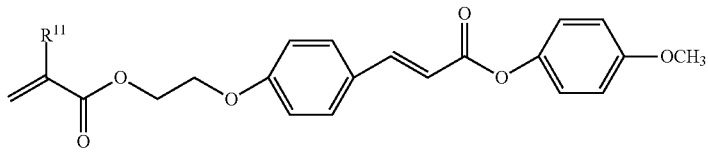
(I-2-1-a)

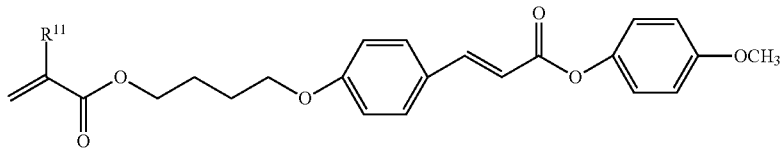
(I-2-1-b)

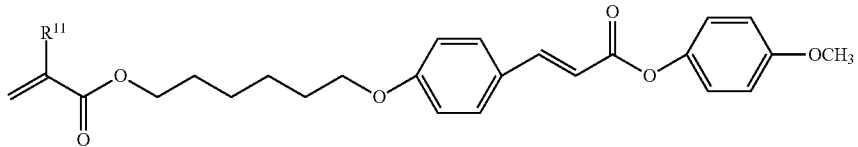
(I-2-1-c)

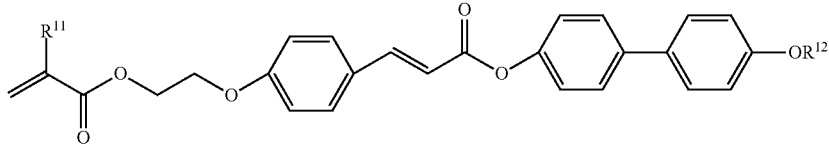
(I-2-1-d)

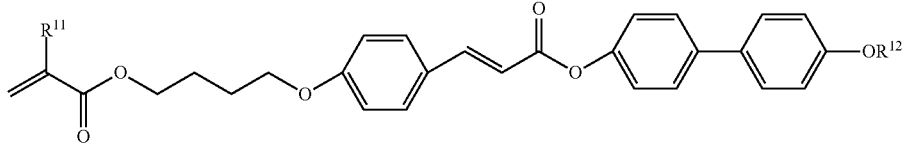
(I-2-1-e)

-continued
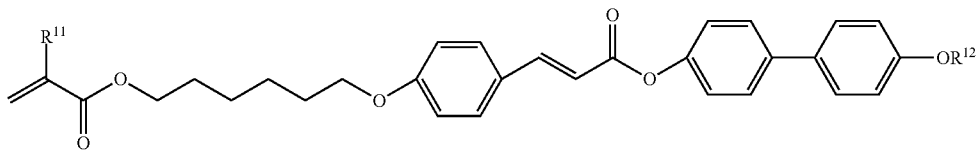
(I-2-1-f)
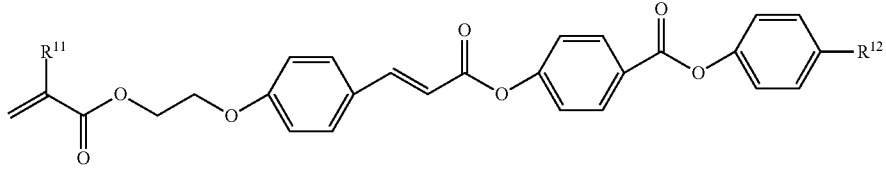
(I-2-1-g)
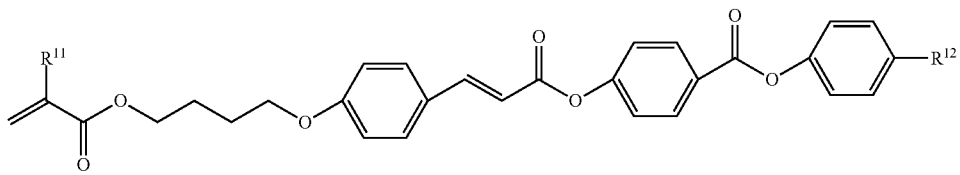
(I-2-1-h)
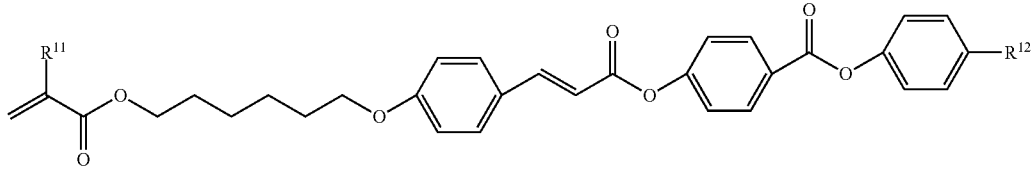
(I-2-1-i)
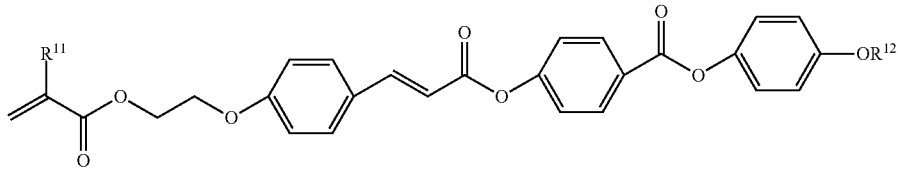
(I-2-1-j)
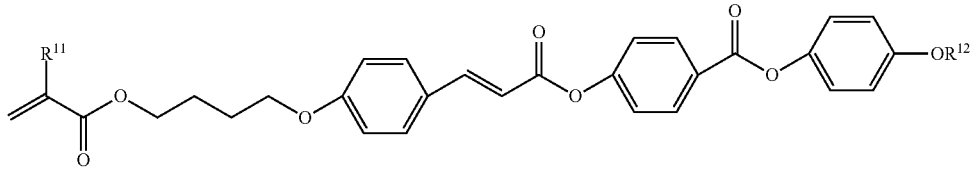
(I-2-1-k)
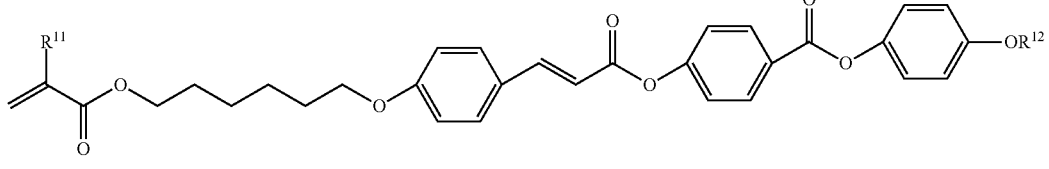
(I-2-1-l)
Formula 19
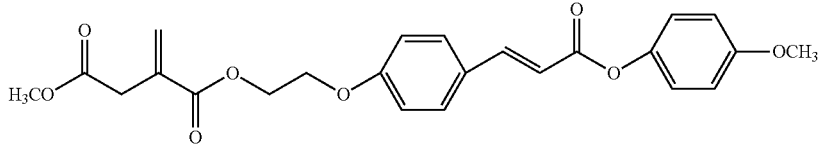
(I-2-1-m)
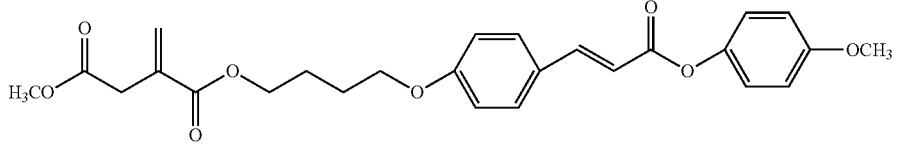
(I-2-1-n)

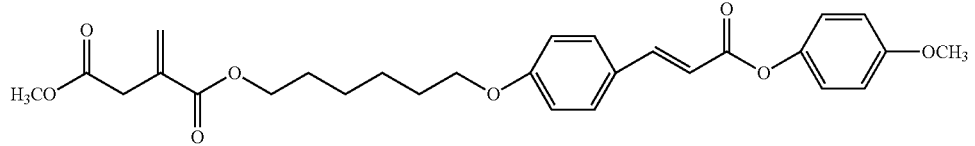
(I-2-1-o)
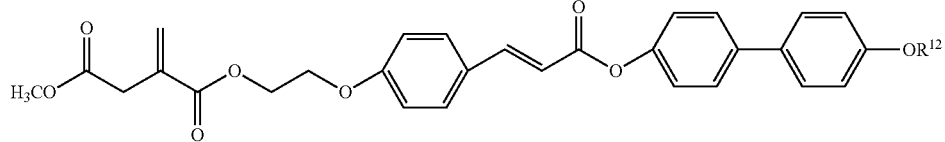
(I-2-1-p)
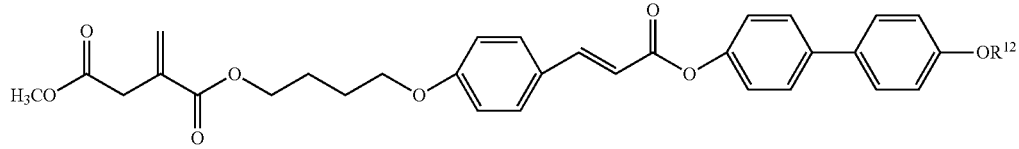
(I-2-1-q)
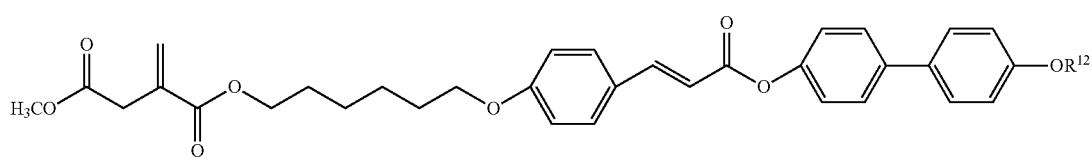
(I-2-1-r)
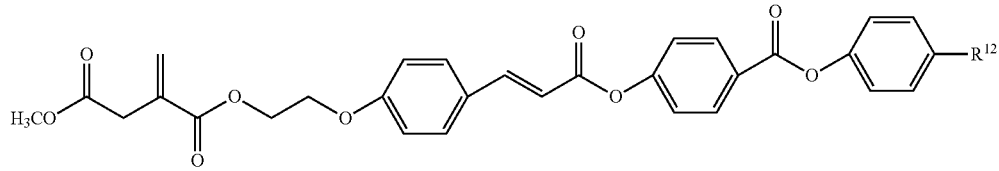
(I-2-1-s)
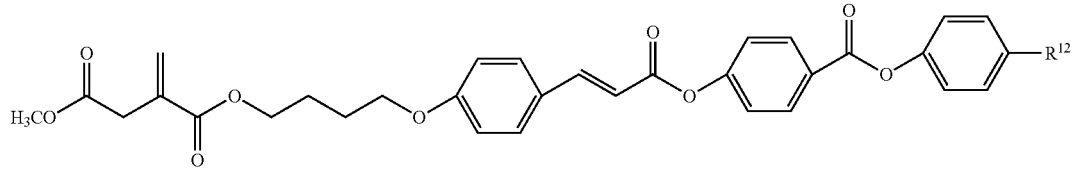
(I-1-2-t)
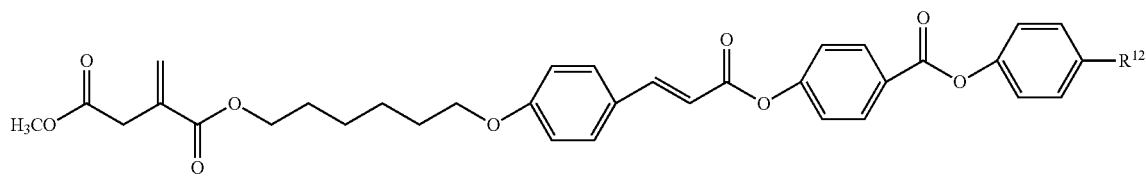
(I-2-1-u)
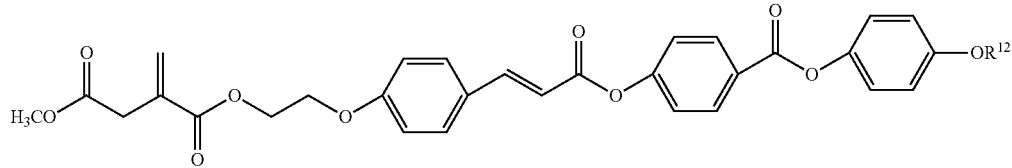
(I-2-1-v)
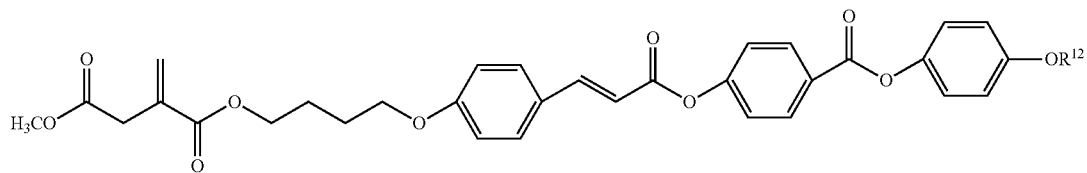
(I-1-2-w)

-continued (I-2-1-x)

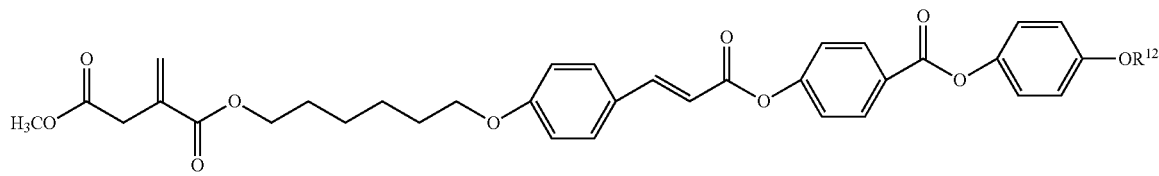

Specific examples of the photoalignable monomer forming the constitutional unit represented by formula (I-3-1) described above include a monomer represented by formulas (I-3-1-a) to (I-3-1-i) and formulas (I-3-1-j) to (I-3-1-r) described below (wherein, in the formulas, $R^{11}$ represents hydrogen or a methyl group, and $R^{12}$ represents hydrogen or an alkyl group having 1 to 10 carbons.)

Formula 20

(I-3-1-a)

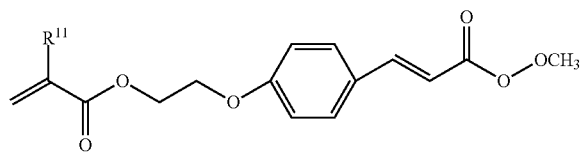

(I-3-1-b)

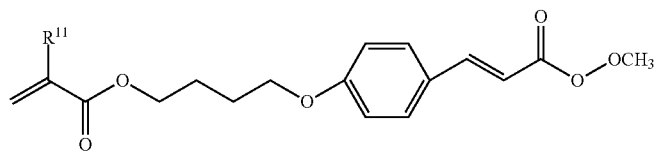

(I-3-1-c)

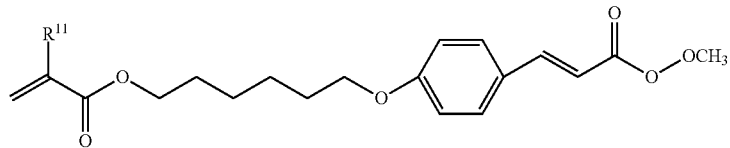

(I-3-1-d)

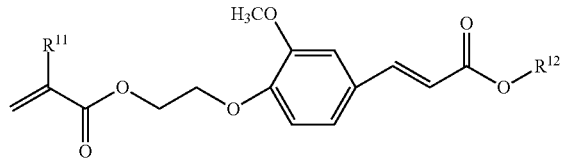

(I-3-1-e)

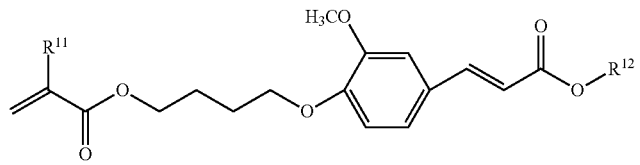

(I-3-1-f)

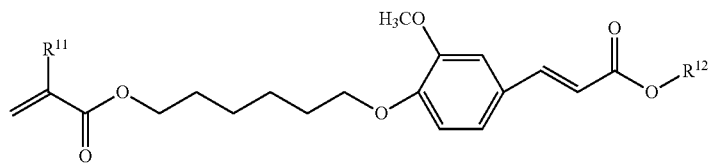

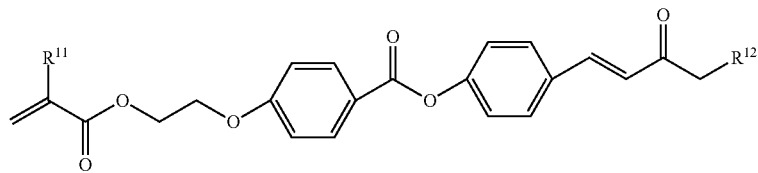
(I-3-1-g)
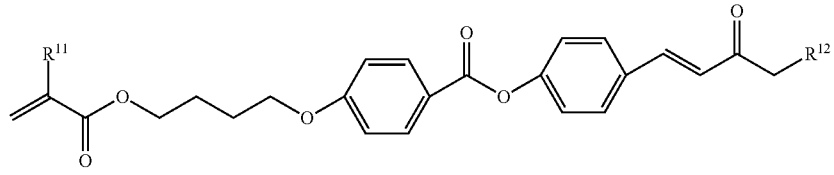
(I-3-1-h)
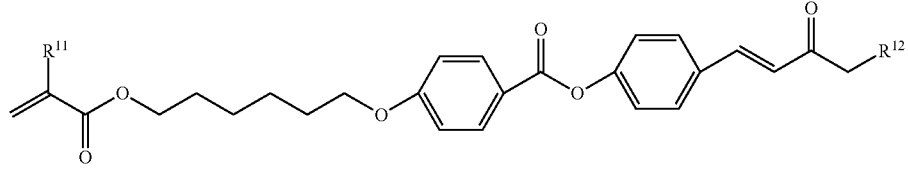
(I-3-1-i)
Formula 21
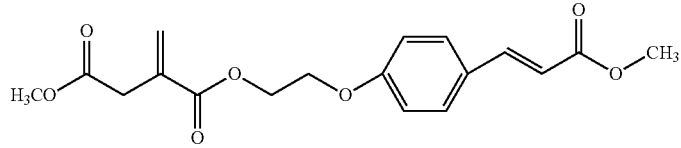
(I-3-1-j)
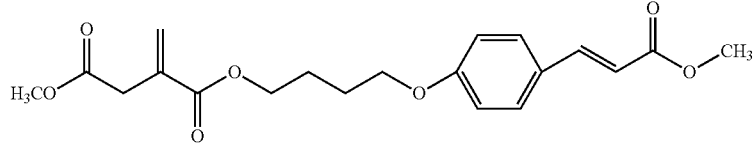
(I-3-1-k)
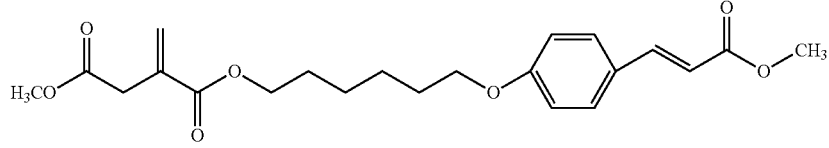
(I-3-1-l)
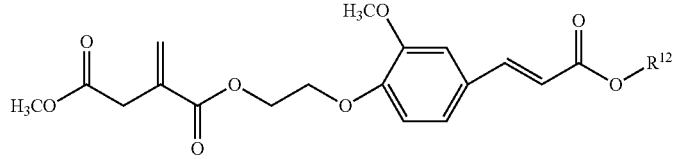
(I-3-1-m)
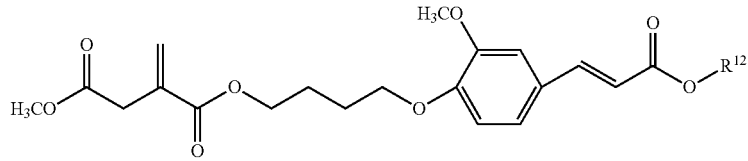
(I-3-1-n)
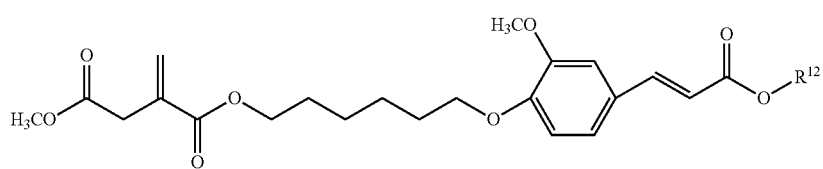
(I-3-1-o)

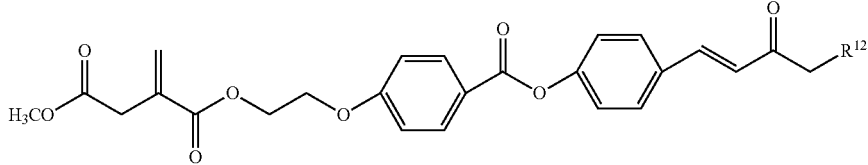

(I-3-1-p)

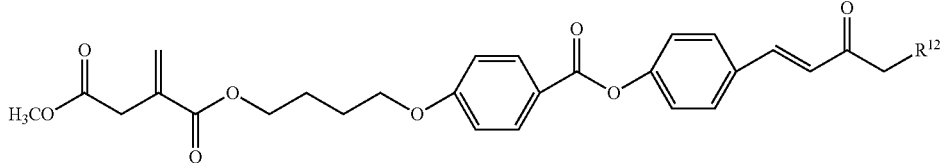

(I-3-1-q)

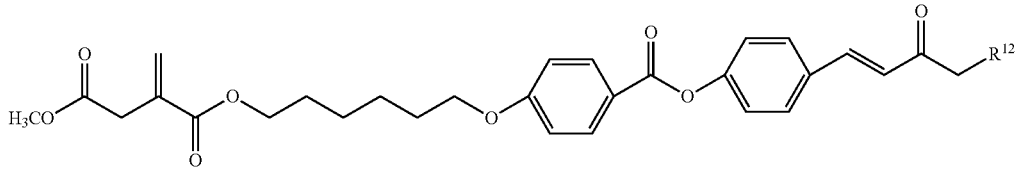

(I-3-1-r)

The monomers can be used alone or in combination with two or more different monomers. Among the monomers, a photoalignable monomer forming a constitutional unit represented by formula (I-3-1) is preferred, and a photoalignable monomer forming a constitutional unit represented by formula (I-3-1) described above, wherein, $R^8$ is a methyl group, q is 0, o is 2, p is 0 and $R^1$ is a methyl group (more specifically, 2-[4-[(E)-2-methoxycarbonylvinyl]phenoxy]ethyl=2-methylacrylate) is further preferred.

The content of the photoalignable monomer in the monomer mixture used for the (meth)acrylate polymer is ordinarily approximately 20% by weight or more and less than approximately 100% by weight, preferably, approximately 40 to approximately 99.99% by weight, and further preferably, approximately 60 to approximately 95% by weight, based on the total monomer.

A method for forming the alignment layer is not particularly limited, and a publicly known method can be applied, but formation by application is preferred. Upon the application, a solvent may be used, and a solvent similar to the solvent used for application of the polymerizable liquid crystal compound can be used. Among the solvents, use in combination with solvents selected from cyclohexane, toluene and cyclopentanone is preferred. An application method similar to the method for applying the polymerizable liquid crystal compound can also be adopted.

Specific examples of the non-photoalignable monomer among the monomers used for formation of the (meth)acrylate polymers include alkyl mono(meth)acrylate, aryl mono(meth)acrylate, acrylamide, methacrylamide, vinyl ether, styrene or a derivative thereof, and any other vinyl monomer such as vinyl ester. Other monomers as described above may be used alone, or in combination with two or more kinds.

Specific examples of the non-photoalignable monomer include (meth)acrylic acid; alkyl mono(meth)acrylate such as methyl (meth)acrylate, ethyl (meth)acrylate, butyl (meth)acrylate and 2-ethylhexyl(meth)acrylate; aryl mono(meth)acrylate such as phenyl(meth)acrylate and benzyl (meth)acrylate; hydroxyalkyl mono(meth)acrylate such as 2-hydroxyethyl(meth)acrylate, 2-hydroxypropyl(meth)acrylate, 2-hydroxybutyl(meth)acrylate and 3-hydroxypropyl (meth)acrylate; carboxyl group-containing mono(meth)acrylate such as ω-carboxypolycaprolactone mono(meth)acrylate, phthalic acid monohydroxyethyl(meth)acrylate, and 2-hydroxy-3-phenoxypropyl(meth)acrylate and hydroxyl group containing mono-(meth)acrylate other than hydroxyalkyl mono(meth)acrylate; polyfunctional (meth)acrylate having no silicone group, fluorine-substituted alkyl group and photoalignable group, such as 1,4-butanediol di(meth)acrylate, 1,6-hexanediol di(meth)acrylate, ethylene glycol di(meth)acrylate, neopentyl glycol di(meth)acrylate, diethylene glycol di(meth)acrylate, triethylene glycol di(meth)acrylate, polyethylene glycol di(meth)acrylate, hydroxy pivalate neopentyl glycol di(meth)acrylate, trimethylol propane tri(meth)acrylate, ethoxylated trimethylol propane tri(meth)acrylate, ditrimethylol propane tetra(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, dicyclopentanyl di(meth)acrylate, ethoxylated hydrogenated bisphenol A di(meth)acrylate, ethoxylated bisphenol A di(meth)acrylate, ethoxylated bisphenol F di(meth)acrylate, ethoxylated bisphenol S di(meth)acrylate, hydroxypropyl di(meth)acrylate, diethylene glycol bishydroxypropyl(meth)acrylate and monohydroxypentaerythritol tri(meth)acrylate, acrylamide, methacrylamide, vinyl ether, styrene or a derivative thereof, vinyl ester, maleic acid or a derivative thereof, maleimide or a derivative thereof, fumaric acid or a derivative thereof, itaconic acid and a vinyl monomer.

When the adhesion between the alignment layer and the liquid crystal composition layer and durability are taken into consideration, other monomers described above preferably include (meth)acrylic acid, alkyl mono(meth)acrylate such as methyl (meth)acrylate, ethyl (meth)acrylate, butyl (meth)acrylate and 2-ethylhexyl(meth)acrylate; and hydroxyalkyl mono(meth)acrylate such as 2-hydroxyethyl(meth)acrylate, 2-hydroxypropyl(meth)acrylate, 2-hydroxybutyl(meth)acrylate and 3-hydroxypropyl(meth)acrylate.

As a combination of the photoalignable monomer and the non-photoalignable monomer used for the (meth)acrylate polymer, 2-[4-[(E)-2-methoxycarbonyl vinyl]phenoxy]ethyl=2-methylacrylate being a photoalignable monomer, and as a non-photoalignable monomer, 2-hydroxyethyl methacrylate, methyl(meth)acrylate, (meth)acrylic acid or the like are particularly preferred.

In addition, the polymerizable liquid crystal compound may be occasionally aligned homogeneously even by a method for directly rubbing the support substrate or by applying a film subjected orientation treatment as the support substrate.

Thickness of the liquid crystal composition layer relating to the invention changes depending on retardation suitable for a target device or birefringence (an) of the polymerizable liquid crystal compound constituting the layer. Preferred thickness is approximately 0.05 to approximately 50 micrometers, a further preferred range is approximately 0.1 to approximately 20 micrometers, and a still further preferred range is approximately 0.2 to approximately 10 micrometers.

A preferred haze value of the film relating to the invention is ordinarily approximately 1.5% or less, and preferred transmittance is approximately 80% or more. A further preferred haze value is approximately 1.0% or less, and further preferred transmittance is approximately 95% or more. Transmittance preferably meets the conditions in a visible light region. When the liquid crystal composition layers are stacked and used as shown in FIG. 4, the second liquid crystal composition layer should be provided on the first liquid crystal composition layer such that the thickness of the second liquid crystal composition layer becomes ordinarily approximately 0.4 time to approximately 10.0 times, preferably, approximately 1.0 time to approximately 6.0 times, and further preferably, approximately 1.2 times to approximately 6.0 times, based on the thickness of the first liquid crystal composition layer.

The patterned retardation film is effective as an optical device applied to a liquid crystal display device (in particular, an active matrix and passive matrix liquid crystal display device), or as an optical device applied to organic electroluminescence. Specific examples of modes of the liquid crystal display device suitable for using the patterned retardation film include an IPS (in-plane switching) mode, an OCB (optically compensated birefringence) mode, a TN (twisted nematic) mode, an STN (supertwisted nematic) mode, an ECB (electrically controlled birefringence) mode, a DAP (deformation of aligned phase) mode, a CSH (color super homeotropic) mode, a VAN/VAC (vertically aligned nematic/cholesteric) mode, an OMI (optical mode interference) mode, and an SBE (super-birefringence effect) mode. The patterned retardation film can also be used as a guest-host mode, ferroelectric mode, antiferroelectric mode or the like display device. In addition, an optimum value of parameters such as a tilt angle distribution in a thickness direction and thickness required for the patterned retardation film strongly depends on a kind and an optical parameter of the liquid crystal display device to be compensated, and therefore changes depending on a type of the device. The patterned retardation film includes a ¼λ film and a ½λ film. The films are obtained when the polymerizable liquid crystal compounds are homogeneously aligned.

The liquid crystal display device described above can be applied to a three-dimensional image display apparatus. As the three-dimensional image display apparatus, the three-dimensional image display apparatus described in EP 0829744 A, EP 0887666 A, EP 0887692 A, U.S. Pat. No. 6,046,849 B, U.S. Pat. No. 6,437,915 B or the like is preferably used. In application to an organic electroluminescence display device, a three-dimensional image can be displayed by using the patterned retardation film of the invention when a constitution of emitting linearly polarized light is formed.

The patterned retardation film can be used also as an optical device integrated with a polarizing plate or the like, and is arranged outside a liquid crystal cell in the above case. However, the patterned retardation film has no or little impurity elution to a liquid crystal filled in a cell, and therefore can also be arranged inside the liquid crystal cell. If a photolithography technology is applied, a patterned retardation film having a different optical parameter can be arranged by each pixel having a different wavelength region such as blue, green and red of a liquid crystal display device, or in a predetermined partition formed by dividing and demarcating one pixel. For example, when a method disclosed in JP 2001-222009 A is applied, a transflective liquid crystal display device having an improved light utilization efficiency can be constructed by dividing one pixel into a reflective display part and a transparent display part on which a ¼λ film formed of a liquid crystal film is arranged. More specifically, display performance of the liquid crystal display device can further be improved.

In the following, the invention will be explained in detail by way of Examples, but the invention is not limited to the Examples.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Example 1

Preparation of Composition (PLC-1)

Mixture (MIX-1) of polymerizable liquid crystal compounds including 30% by weight of compound (M1a-5) (n=6), 30% by weight of (M1a-7) (n=6), 5% by weight of compound (M2a-4) (n=6) and 35% by weight of compound (M2b-2) (n=6) was prepared.

Next, to 100 parts by weight of mixture (MIX-1) of the polymerizable liquid crystal compounds, as an antistripping additive, 10 parts by weight of oxetane methacrylate OXE-30 (trade name, made by OSAKA ORGANIC CHEMICAL INDUSTRY LTD.) were added, as a polymerization initiator, 5 parts by weight of Irgacure 907 (trade name, made by BASF Japan, Ltd.) were added, as a photopolymerization initiator, 1 part by weight of Irgacure 250 (trade name, made by BASF Japan, Ltd.) was added, and as a surfactant, 0.2 part by weight of BYK-361N (trade name, made by BYK Japan KK) was added, and the resulting mixture was dissolved into toluene to prepare a solution having a (MIX-1) concentration of 25% by weight. The solution is taken as (PLC-1).

Production of Polymerizable Liquid Crystal Film (F-1)

As a support substrate, a 60 micrometer-thick film prepared using triacetyl cellulose was prepared. On the support substrate, an aligning agent (copolymer of 2-[4-[(E)-2-methoxycarbonylvinyl]phenoxy]ethyl-2-methylacrylate (component A) and 2-hydroxyethyl methacrylate (component B) (copolymerization ratio=component A/component B=95/5 (weight ratio)), a weight average molecular weight of approximately 70,000, solvent: cyclohexane/toluene/cyclopentanone=1/6/3 (weight ratio), polymer concentration 5 wt %)) was applied by bar coating and dried for 1 minute at 100° C. to form a 0.1 micrometer-thick alignment layer. The alignment layer was exposed, using a photomask patterned in a stripe shape, from a direction of 90 degrees to an application surface of the alignment layer with linearly-polarized ultraviolet light having a wavelength near 313 nanometers. In the exposure, the alignment layer was exposed with linearly polarized light for an aligning direction of the polymerizable liquid crystal compound to be in parallel to a longitudinal direction of the support substrate. Next, the photomask was removed and the alignment layer was exposed with linearly polarized light in a direction perpendicular to a first exposure direction. Thus, as shown in FIG. 3, alignment layer 302 for aligning a polymerizable liquid crystal compound is formed on support substrate 301 to be in a state in which alignment directions 104 of the polymerizable liquid crystal compound are different with each other.

Figure 5:
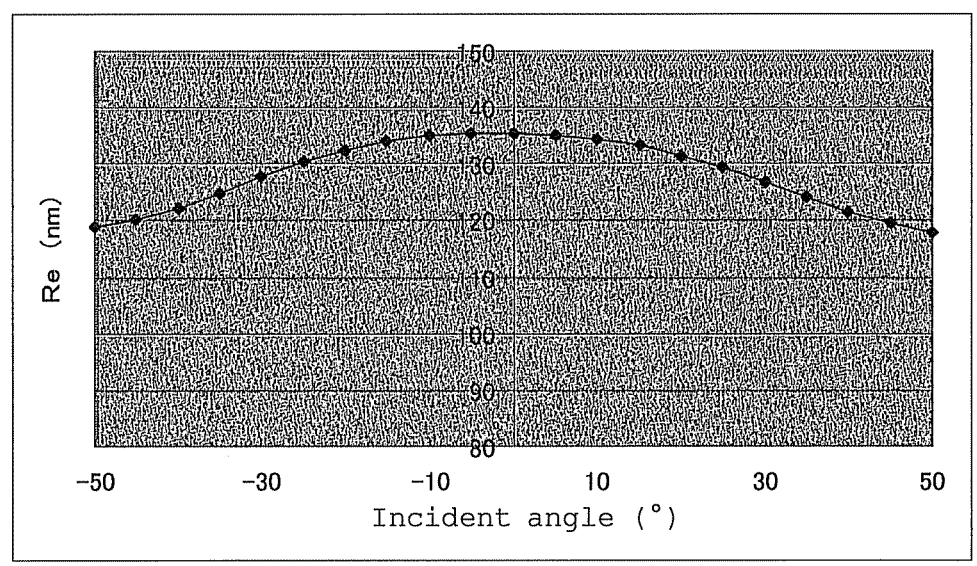
FIG. 5 is a diagram showing retardation indicating homogeneous alignment.

Next, on the alignment layer, solution (PLC-1) of the polymerizable liquid crystal composition was aligned by bar coating, and a coated material is dried at 60° C. for 1 minute to align the polymerizable liquid crystal compound in each direction of the alignment layer. In air, a sample was irradiated for 6 seconds with light (365 nm) having an intensity of 65 mW/cm$^2$ using a 250 W ultrahigh pressure mercury lamp at room temperature to give polymerizable liquid crystal film (F-1) in which alignment of the polymerizable liquid crystal compound was patterned was obtained. Thickness of the liquid crystal composition layer was 1 micrometer. Retardation of the polymerizable liquid crystal film was measured using OPTIPRO Ellipsometer made by SHINTECH. Inc., and a graph convex upward as shown in FIG. 5 was obtained. The graph shows that the polymerizable liquid crystal film has homogeneous alignment.

Retardation is represented by multiplication: Δn d. Symbol Δn represents optical anisotropy and symbol d represents thickness of a polymer film. The thickness of the polymer film can be measured with a stylus profiler such as Alpha-Step IQ made by KLA-Tencor Corporation, a spectrophotometer or the like, and Δn can be determined from a measured value of retardation and a measured value of thickness.

(Adhesion Test)

In accordance with the method according to JIS K5600-5-6, the polymerizable liquid crystal film obtained was cut in cross-cut-shaped 100 squares using a cutter knife, and CELLOTAPE No. 405 for industry use (made by NICHIBAN CO., LTD.) was once adhered thereon and then peeled. A ratio of the number of squares remaining on the support substrate based on 100 squares was represented as a film remaining ratio (%), and thus strength of adhesion was evaluated. (A higher film remaining ratio means higher adhesion.) As a result, the film remaining ratio was 100%.

(Durability Test)

The liquid crystal film obtained was charged into environment test equipment set at a temperature of 80° C. and a humidity of 90%, and removed after lapse of a fixed period of time, strength of adhesion was evaluated again, and the result was taken as a durability evaluation. The result showed that the film remaining ratio after 72 hours was 90%.

Example 2

Preparation of Composition (PLC-2)

Next, to 100 parts by weight of mixture (MIX-1) of the polymerizable liquid crystal compounds described in Example 1, as an antistripping additive, 10 parts by weight of oxetane acrylate OXE-10 (trade name, made by OSAKA ORGANIC CHEMICAL INDUSTRY LTD.) were added, as a polymerization initiator, 5 parts by weight of Irgacure 907 (trade name, made by BASF Japan, Ltd.) were added, and as a surfactant, 0.2 part by weight of BYK-361N (trade name, made by BYK Japan KK) was added, and the resulting mixture was dissolved into toluene to prepare a solution having a (MIX-1) concentration of 25% by weight. The solution is taken as (PLC-2).

Production of Liquid Crystal Film (F-2)

Polymerizable liquid crystal film (F-2) was produced in a manner similar to the production in Example 1 except that solution (PLC-2) of the polymerizable liquid crystal composition was applied onto the alignment layer described in Example 1. Thickness of the liquid crystal composition layer was 1 micrometer. Measurement of retardation by a method similar to the method in Example 1 showed that the liquid crystal film had homogeneous alignment. A result of evaluation of adhesion of the sample showed that the film remaining ratio was 100%. Furthermore, the result of the durability test showed that the film remaining ratio was 95%.

Example 3

Preparation of Composition (PLC-3)

To 100 parts by weight of a polymerizable liquid crystal compound (LC-242: bis[4-[4-(acryloyloxy)buthoxycarbonyloxy]benzoic acid]2-methyl-1,4-phenylene, made by BASF), as an antistripping additive, 10 parts by weight of oxetane methacrylate OXE-30 (trade name, made by OSAKA ORGANIC CHEMICAL INDUSTRY LTD.) were added, as a polymerization initiator, 5 parts by weight of Irgacure 907 (trade name, made by BASF Japan, Ltd.) were added, and as a surfactant, 0.2 part by weight of BYK-361N (trade name, made by BYK Japan KK) was added, and the resulting mixture was dissolved into toluene to prepare a solution having a concentration of 25% by weight. The solution is taken as (PLC-3).

Production of Liquid Crystal Film (F-3)

Polymerizable liquid crystal film (F-3) was produced in a manner similar to the production in Example 1 except that solution (PLC-3) of the polymerizable liquid crystal composition was applied onto the alignment layer described in Example 1. Thickness of the liquid crystal composition layer was 1 micrometer. Measurement of retardation by a method similar to the method described in Example 1 showed that the liquid crystal film had homogeneous alignment. A result of evaluation of adhesion of the sample showed that the film remaining ratio was 100%. Furthermore, the result of the durability test showed that the film remaining ratio was 90%.

Example 4

Preparation of Composition (PLC-4)

To 100 parts by weight of the polymerizable liquid crystal compound (LC-242, made by BASF) described in Example 3, as an antistripping additive, 10 parts by weight of oxetane methacrylate OXE-10 (trade name, made by OSAKA ORGANIC CHEMICAL INDUSTRY LTD.) were added, as polymerization initiators, 5 parts by weight of Irgacure 907 (trade name, made by BASF Japan, Ltd.) and 1 part by weight of Irgacure 250 (trade name, made by BASF Japan, Ltd.) were added, and as a surfactant, 0.2 part by weight of BYK-361N (trade name, made by BYK Japan KK) was added, and the resulting mixture was dissolved into toluene to prepare a solution having a concentration of 25% by weight. The solution is taken as (PLC-4).

Production of Liquid Crystal Film (F-4)

Polymerizable liquid crystal film (F-4) was produced in a manner similar to the production described in Example 1 except that solution (PLC-4) of the polymerizable liquid crystal composition was applied onto the alignment layer described in Example 1. Thickness of the liquid crystal composition layer was 1 micrometer. Measurement of retardation by a method similar to the method described in Example 1 showed that the liquid crystal film had homogeneous alignment. A result of evaluation of adhesion of the sample showed that the film remaining ratio was 100%. Furthermore, the result of the durability test showed that the film remaining ratio was 90%.

Example 5

Preparation of Composition (PLC-5)

To 100 parts by weight of the polymerizable liquid crystal compound (LC-242, made by BASF) described in Example 3, as an antistripping additive, 10 parts by weight of glycidyl methacrylate were added, as polymerization initiators, 5 parts by weight of Irgacure 907 (trade name, made by BASF Japan, Ltd.) and 1 part by weight of Irgacure 250 (trade name, made by BASF Japan, Ltd.) were added, and as a surfactant, 0.2 part by weight of BYK-361N (trade name, made by BYK Japan KK) was added, and the resulting mixture was dissolved into toluene to prepare a solution having a concentration of 25% by weight. The solution is taken as (PLC-5).

Production of a Liquid Crystal Film (F-5)

Polymerizable liquid crystal film (F-5) was produced in a manner similar to the production described in Example 1 except that solution (PLC-5) of the polymerizable liquid crystal composition was applied onto the alignment layer described in Example 1. Thickness of the liquid crystal composition layer was 1 micrometer. Measurement of retardation by a method similar to the method described in Example 1 showed that the liquid crystal film had homogeneous alignment. A result of evaluation of adhesion of the sample showed that the film remaining ratio was 100%. Furthermore, the result of the durability test showed that the film remaining ratio was 90%.

Example 6

Preparation of Composition (PLC-6)

Mixture (MIX-6) of polymerizable liquid crystal compounds including 40% by weight of compound (M1a-1) (n=10), 40% by weight of the polymerizable liquid crystal compound (LC-242, made by BASF) described in Example 3 and 20% by weight of (M2a-5) (n=8) was prepared.

Next, to 100 parts by weight of mixture (MIX-6) of the polymerizable liquid crystal compounds, as an antistripping additive, 10 parts by weight of oxetane methacrylate OXE-10 (trade name, made by OSAKA ORGANIC CHEMICAL INDUSTRY LTD.) were added, as a polymerization initiator, 5 parts by weight of Irgacure 907 (trade name, made by BASF Japan, Ltd.) were added, and as a surfactant, 0.2 part by weight of BYK-361N (trade name, made by BYK Japan KK) was added, and the resulting mixture was dissolved into cyclohexanone to prepare a solution having a (MIX-6) concentration of 25% by weight. The solution is taken as (PLC-6).

Production of Liquid Crystal Film (F-6)

Polymerizable liquid crystal film (F-6) was produced in a manner similar to the production described in Example 1 except that solution (PLC-6) of the polymerizable liquid crystal composition was applied onto the alignment layer described in Example 1. Thickness of the liquid crystal composition layer was 1 micrometer. Measurement of retardation by a method similar to the method described in Example 1 showed that the liquid crystal film had homogeneous alignment. A result of evaluation of adhesion of the sample showed that the film remaining ratio was 100%. Furthermore, the result of the durability test showed that the film remaining ratio was 95%.

Example 7

Preparation of Composition (PLC-7)

Mixture (MIX-7) of polymerizable liquid crystal compounds including 50% by weight of compound (M2a-1) (n=4), 20% by weight of (M2b-2) (n=6), and 30% by weight of compound (M2b-2) (n=3) was prepared.

To 100 parts by weight of the mixture (MIX-7) of the polymerizable liquid crystal compounds, as an antistripping additive, 10 parts by weight of glycidyl methacrylate were added, as a polymerization initiator, 5 parts by weight of Irgacure 907 (trade name, made by BASF Japan, Ltd.) were added, and as a surfactant, 0.2 part by weight of BYK-361N (trade name, made by BYK Japan KK) was added, and the resulting mixture was dissolved into toluene to prepare a solution having a (MIX-7) concentration of 25% by weight. The solution is taken as (PLC-7).

Production of Liquid Crystal Film (F-7)

Polymerizable liquid crystal film (F-7) was produced in a manner similar to the production described in Example 1 except that solution (PLC-7) of the polymerizable liquid crystal composition was applied onto the alignment layer described in Example 1. Thickness of the liquid crystal composition layer was 1 micrometer. Measurement of retardation by a method similar to the method described in Example 1 showed that the liquid crystal film had homogeneous alignment. A result of evaluation of adhesion of the sample showed that the film remaining ratio was 100%. Furthermore, the result of the durability test showed that the film remaining ratio was 90%.

Example 8

Preparation of Composition (PLC-8)

Mixture (MIX-8) of polymerizable liquid crystal compounds including 10% by weight of compound (M1a-16) (n=6), 20% by weight of compound (M1a-17) (n=8), 60% by weight of compound (M2b-3) (n=2), and 10% by weight of compound (M2c-2) (n=4) was prepared.

To 100 parts by weight of the mixture (MIX-8) of the polymerizable liquid crystal compounds, as an antistripping additive, 10 parts by weight of oxetane methacrylate OXE- 10 (trade name, made by OSAKA ORGANIC CHEMICAL INDUSTRY LTD.) were added, as polymerization initiators, 5 parts by weight of Irgacure 907 (trade name, made by BASF Japan, Ltd.) and 1 part by weight of Irgacure 250 (trade name, made by BASF Japan, Ltd.) were added, and as a surfactant, 0.2 part by weight of BYK-361N (trade name, made by BYK Japan KK) was added, and the resulting mixture was dissolved into cyclohexanone to prepare a solution having a (MIX-8) concentration of 25% by weight. The solution is taken as (PLC-8).

Production of Liquid Crystal Film (F-8)

Polymerizable liquid crystal film (F-8) was produced in a manner similar to the production described in Example 1 except that solution (PLC-8) of the polymerizable liquid crystal composition was applied onto the alignment layer described in Example 1. Thickness of the liquid crystal composition layer was 1 micrometer. Measurement of retardation by a method similar to the method described in Example 1 showed that the liquid crystal film had homogeneous alignment. A result of evaluation of adhesion of the sample showed that the film remaining ratio was 100%. Furthermore, the result of the durability test showed that the film remaining ratio was 95%.

Example 9

Preparation of Composition (PLC-9)

Mixture (MIX-9) of polymerizable liquid crystal compounds including 55% by weight of compound (M2a-6) (n=4), 5% by weight of compound (M2a-9) (n=6) and 40% by weight of compound (M2c-7) (n=2) was prepared.

To 100 parts by weight of the mixture (MIX-9) of the polymerizable liquid crystal compounds, as an antistripping additive, 10 parts by weight of epoxycyclohexyl methacrylate were added, as polymerization initiators, 5 parts by weight of Irgacure 907 (trade name, made by BASF Japan, Ltd.) and 3 parts by weight of Irgacure 250 (trade name, made by BASF Japan, Ltd.) were added, as a photosensitizer, 0.3 part by weight of 9,10-dipropoxyanthracene was added, and as a surfactant, 0.2 part by weight of BYK-361N (trade name, made by BYK Japan KK) was added, and the resulting mixture was dissolved into toluene to prepare a solution having a (MIX-9) concentration of 25% by weight. The solution is taken as (PLC-9).

Production of Liquid Crystal Film (F-9)

Polymerizable liquid crystal film (F-9) was produced in a manner similar to the production described in Example 1 except that solution (PLC-9) of the polymerizable liquid crystal composition was applied onto the alignment layer described in Example 1. Thickness of the liquid crystal composition layer was 1 micrometer. Measurement of retardation by a method similar to the method described in Example 1 showed that the liquid crystal film had homogeneous alignment. A result of evaluation of adhesion of the sample showed that the film remaining ratio was 100%. Furthermore, the result of the durability test showed that the film remaining ratio was 100%.

Comparative Example 1

Preparation of Composition (H-1)

To 100 parts by weight of mixture (MIX-1) of the polymerizable liquid crystal compounds described in Example 1, as a polymerization initiator, 5 parts by weight of Irgacure 907 (trade name, made by BASF Japan, Ltd.) were added, and as a surfactant, 0.2 part by weight of BYK-361N (trade name, made by BYK Japan KK) was added, and the resulting mixture was dissolved into toluene to prepare a solution having a (MIX-1) concentration of 25% by weight. The solution is taken as (H-1).

Production of Liquid Crystal Film (F-H1)

Polymerizable liquid crystal film (F-H1) was produced in a manner similar to the production described in Example 1 except that solution (H-1) of the polymerizable liquid crystal composition was applied onto the alignment layer described in Example 1. Thickness of the liquid crystal composition layer was 1 micrometer. Measurement of retardation by a method similar to the method described in Example 1 showed that the liquid crystal film had homogeneous alignment. A result of evaluation of adhesion of the sample showed that the film remaining ratio was 0%.

Comparative Example 2

Preparation of Composition (H-2)

To 100 parts by weight of the polymerizable liquid crystal compound (LC-242, made by BASF) described in Example 3, as a polymerization initiator, 5 parts by weight of Irgacure 907 (trade name, made by BASF Japan, Ltd.) were added, and as a surfactant, 0.2 part by weight of BYK-361N (trade name, made by BYK Japan KK) was added, and the resulting mixture was dissolved into toluene to prepare a solution having a concentration of 25% by weight. The solution is taken as (H-2).

Production of Liquid Crystal Film (F-H2)

Polymerizable liquid crystal film (F-H2) was produced in a manner similar to the production described in Example 1 except that solution (H-2) of the polymerizable liquid crystal composition was applied onto the alignment layer described in Example 1. Thickness of the liquid crystal composition layer was 1 micrometer. Measurement of retardation by a similar method described in Example 1 showed that the liquid crystal film had homogeneous alignment. A result of evaluation of adhesion of the sample showed that the film remaining ratio was 0%.

Comparative Example 3

Preparation of Composition (H-3)

Composition (MIX-3) having a composition described below was prepared. To 100 parts by weight of the composition (MIX-3), as polymerization initiators, 5 parts by weight of Irgacure 907 (trade name, made by BASF Japan, Ltd.) and 2 parts by weight of CPI-100P (trade name, made by SAN-APRO LTD.) were added, and the resulting mixture was dissolved into toluene to prepare a solution having a (MIX-3) concentration of 25% by weight. The solution is taken as (H-3).

Formula 22

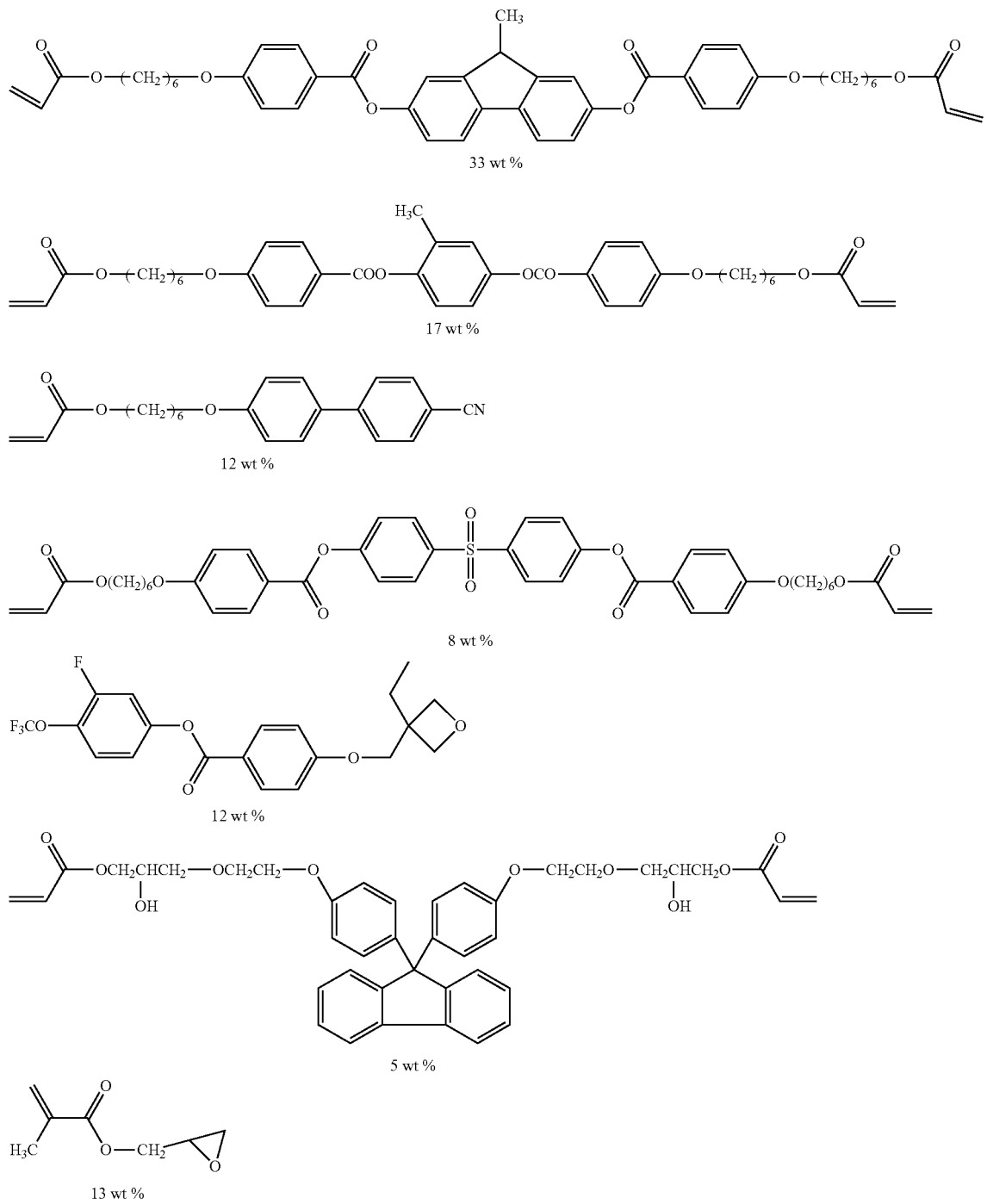

Production of Liquid Crystal Film (F-H3)

Polymerizable liquid crystal film (F-H3) was produced in a manner similar to the production described in Example 1 except that solution (H-3) of the polymerizable liquid crystal composition was applied onto the alignment layer described in Example 1. Thickness of the liquid crystal composition layer was 1 micrometer. The sample showed homeotropic alignment. A result of evaluation of adhesion of the sample showed that the film remaining ratio was 0%.

Comparative Example 4

Preparation of Composition (H-4)

Composition (MIX-4) having a composition described below was prepared. To 100 parts by weight of the composition (MIX-4), as polymerization initiators, 5 parts by weight of Irgacure 907 (trade name, made by BASF Japan, Ltd.) and 2 parts by weight of CPI-100P (trade name, made by SAN-APRO LTD.) were added, and the resulting mixture was dissolved into toluene to prepare a solution having a (MIX-4) concentration of 25% by weight. The solution is taken as (H-4).

in Example 1. Thickness of the liquid crystal composition layer was 1 micrometer. The sample showed homeotropic alignment. A result of evaluation of adhesion of the sample showed that the film remaining ratio was 0%.

Formula 23

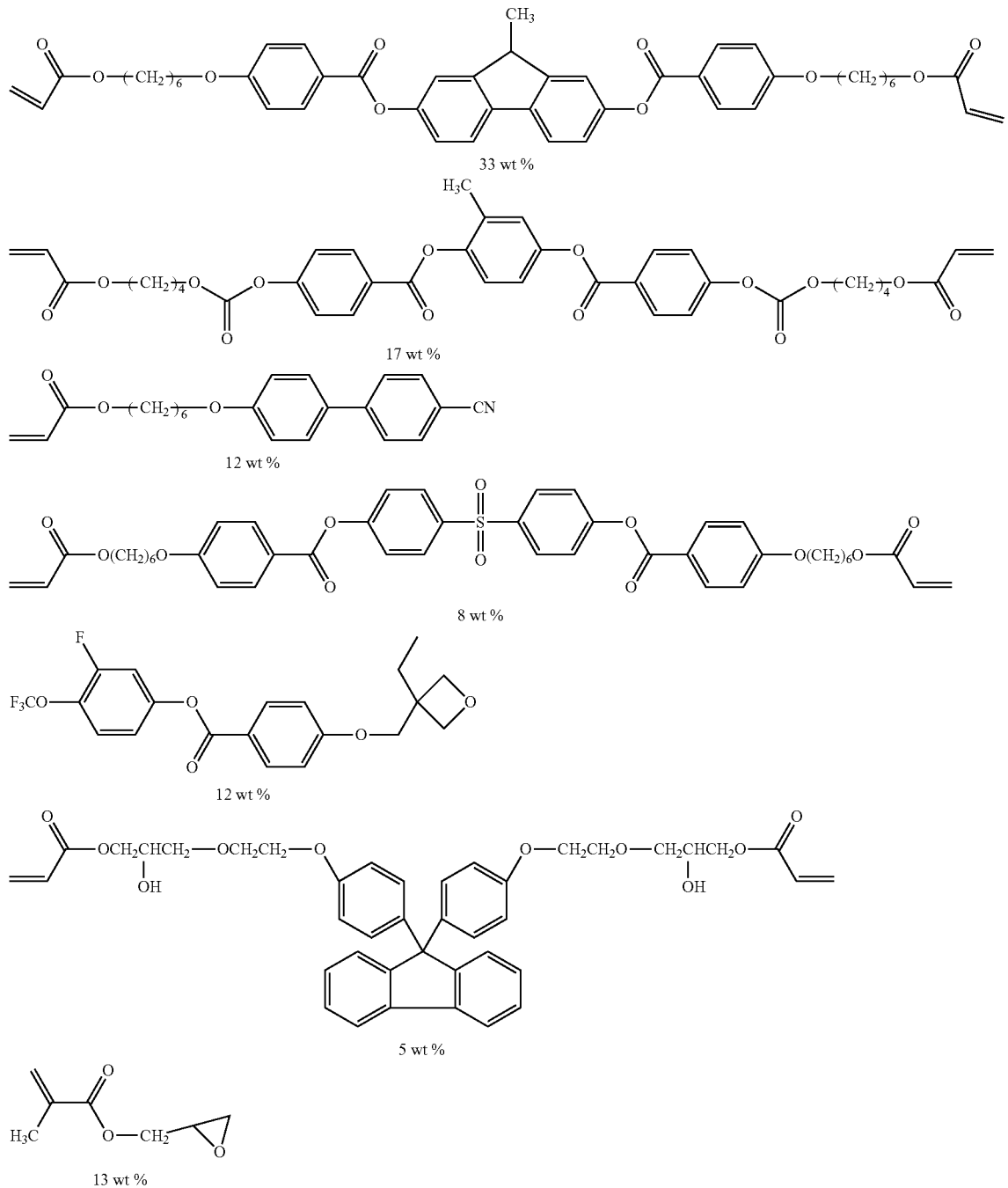

Production of Liquid Crystal Film (F-H4)

Polymerizable liquid crystal film (F-H4) was produced in a manner similar to the production described in Example 1 except that solution (H-4) of the polymerizable liquid crystal composition was applied onto the alignment layer described Comparative Example 5

Preparation of Composition (H-5)

Composition (MIX-5) having a composition described below was prepared. To 100 parts by weight of the composition (MIX-5), as apolymerization initiators, 5 parts by weight of Irgacure 907 (trade name, made by BASF Japan, Ltd.) and 2 parts by weight of CPI-100P (trade name, made by SAN-APRO LTD.) were added, and the resulting mixture was dissolved into toluene to prepare a solution having a (MIX-5) concentration of 25% by weight. The solution is taken as (H-5).

Production of Liquid Crystal Film (F-H5)

Polymerizable liquid crystal film (F-H5) was produced in a manner similar to the production described in Example 1 except that solution (H-5) of the polymerizable liquid crystal composition was applied onto the alignment layer described in Example 1. Thickness of the liquid crystal composition layer was 1 micrometer. The sample showed homeotropic Formula 24

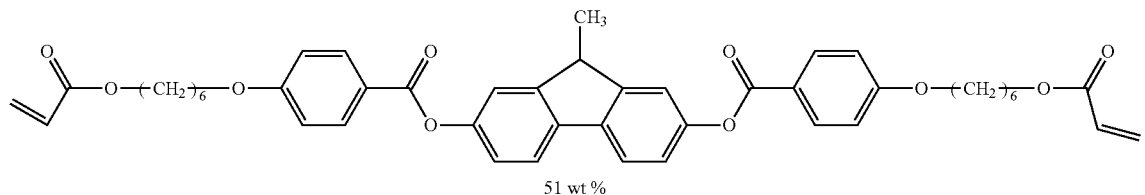
51 wt %

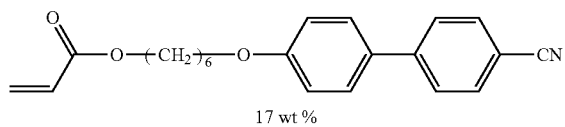
17 wt %

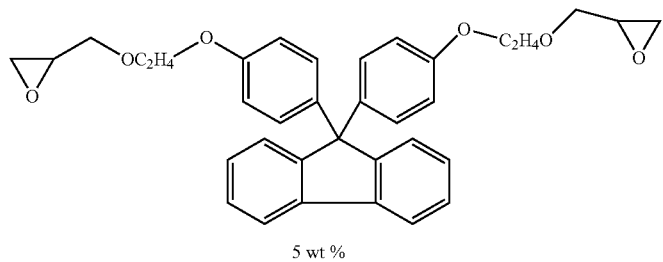
5 wt %

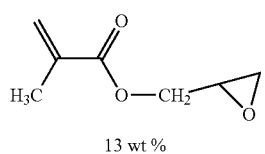
13 wt %

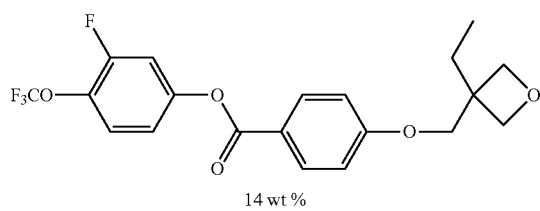
14 wt % alignment. A result of evaluation of adhesion of the sample showed that the film remaining ratio was 0%.

Comparative Example 6

Preparation of Composition (H-6)

Composition (MIX-10) having a composition described below was prepared. To 100 parts by weight of the composition (MIX-10), as polymerization initiators, 5 parts by weight of Irgacure 907 (trade name, made by BASF Japan, Ltd.) and 2 parts by weight of CPI-100P (trade name, made by SAN-APRO LTD.) were added, and the resulting mixture was dissolved into toluene to prepare a solution having a (MIX-10) concentration of 25% by weight. The solution is taken as (H-6).

Formula 25

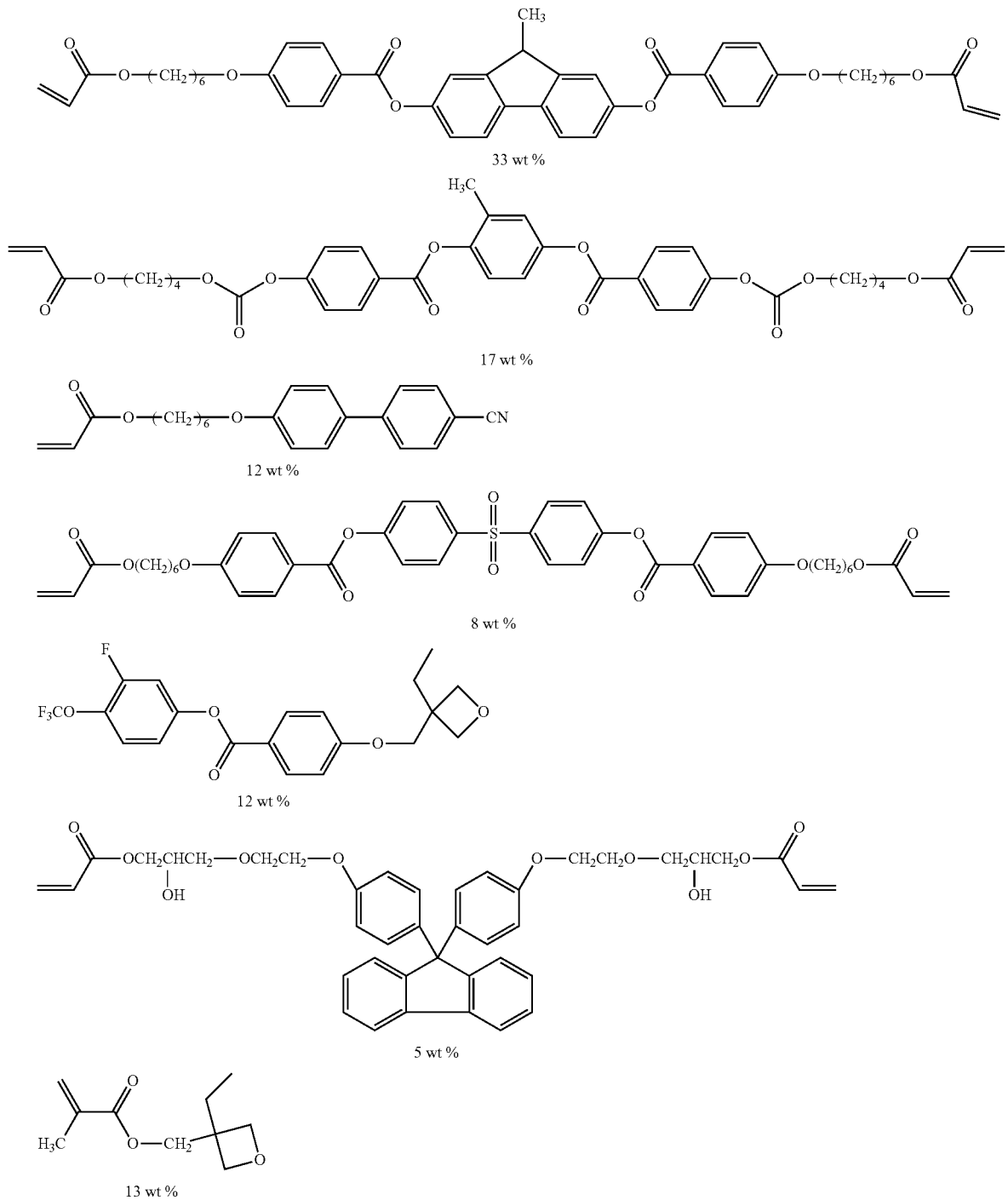

Production of Liquid Crystal Film (F-H6)

Polymerizable liquid crystal film (F-H6) was produced in a manner similar to the production described in Example 1 except that solution (H-6) of the polymerizable liquid crystal composition was applied onto the alignment layer described in Example 1. Thickness of the liquid crystal composition layer was 1 micrometer. The sample showed homeotropic alignment. A result of evaluation of adhesion of the sample showed that the film remaining ratio was 0%.

The results in Examples and Comparative Examples as described above show that the liquid crystal composition layer having homogeneous alignment according to the invention is excellent in adhesion with the alignment layer, and durability under a high humidity and high temperature environment. The liquid crystal composition layers used in Examples had adhesion higher than the adhesion in a case where the polymerizable compounds for causing the homeotropic alignment were used in Comparative Examples.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A film of the invention is excellent in adhesion between an alignment layer and a liquid crystal composition layer, and durability, and therefore even if a protective film is stuck on a retardation film in a manufacturing step before the film of the invention is combined with an image display apparatus, a retardation region (liquid crystal composition layer) is not peeled. Moreover, even after the film is incorporated into the image display apparatus, the retardation film is not peeled from the apparatus, and therefore a three-dimensional image display apparatus having excellent long-term reliability can be obtained.

REFERENCE SIGNS LIST

101: Three-dimensional image display apparatus.
102: Polarization direction of emitted light.
103: Patterned retardation film (¼λ plate subjected to patterning treatment).
104: Liquid crystal alignment direction in a retardation film.
105: Schematic diagram of a state of circularly polarized light obtained by passing through the patterned retardation film.
106: Circularly polarized light glasses.
107: Images separated into right eye use and left eye use with polarized glasses.
201: Patterned retardation film (½λ plate subjected to patterning treatment using a second liquid crystal composition layer).
202: Liquid crystal alignment direction in a patterned retardation film.
203: State of linearly polarized light obtained by passing through the patterned retardation film.
204: First liquid crystal composition layer in a three-dimensional image apparatus.
205: Liquid crystal alignment direction in the first liquid crystal composition layer in the three-dimensional image apparatus.
206: Region in which a second liquid crystal composition layer is cured in an isotropic phase or removed with a solvent in the three-dimensional image apparatus.
301: Support substrate.
302: Alignment layer subjected to patterning alignment treatment.
303: Liquid crystal composition layer.
401: Alignment layer subjected to single alignment treatment.
402: First liquid crystal composition layer in a retardation film.
403: Alignment direction of the first liquid crystal composition layer in the retardation film.
404: Second liquid crystal composition layer in the retardation film.
405: Alignment direction of the second liquid crystal composition layer in the retardation film.
406: Region in which the second liquid crystal composition layer is cured in an isotropic phase or removed with a solvent in the retardation film.

What is claimed is:

1. A film comprising at least an alignment layer and a liquid crystal composition layer in order on a support substrate,
wherein the liquid crystal composition layer is obtained by immobilizing alignment of a polymerizable liquid crystal compound contained in a polymerizable liquid crystal composition, an alignment state thereof includes homogeneous alignment, and the polymerizable liquid crystal composition contains one kind or two or more kinds of antistripping additives having a radically polymerizable group and a cationically polymerizable group in a molecule, the polymerizable liquid crystal compound consisting essentially of one or more compounds selected from the formula

  (M1)

  (M2)

wherein $P^1$ is independently a polymerizable group; $R^1$ is independently hydrogen, fluorine, chlorine, —CN or alkyl having 1 to 20 carbons, and in the alkyl, arbitrary —$CH_2$— may be replaced by —O—, —COO— or —OCO—, and arbitrary hydrogen may be replaced by halogen; $A^1$ is independently 1,4-cyclohexylene, 1,4-phenylene, pyridine-2,5-diyl, pyrimidine-2,5-diyl, naphthalene-2,6-diyl or fluorene-2,7-diyl, but arbitrary hydrogen may be replaced by halogen, alkyl having 1 to 5 carbons or alkyl halide having 1 to 5 carbons; $X^1$ is independently a single bond or alkylene having 1 to 20 carbons, and arbitrary —$CH_2$— in the alkylene may be replaced by —O—, —COO— or —OCO—; $Z^1$ is independently a single bond, —COO—, —OCO—, —$CH_2CH_2$—, —CH=CH—, —C≡C—, —$CH_2O$—, —$OCH_2$—, —$CF_2O$—, —$OCF_2$—, —$CH_2CH_2COO$—, —$OCOCH_2CH_2$—, —CH=CHCOO— or —OCOCH=CH—; and s is independently an integer from 1 to 5.

2. The film according to claim 1, wherein the radically polymerizable group of the antistripping additive includes an acryloyloxy group, a methacryloyloxy group, a maleimide group or a vinyl ketone group.

3. The film according to claim 1, wherein the cationically polymerizable group of the antistripping additive includes an oxiranyl group, an oxetanyl group or a vinyl ether group.

4. The film according to claim 2, wherein the cationically polymerizable group of the antistripping additive includes an oxiranyl group, an oxetanyl group or a vinyl ether group.

5. The film according to claim 1, containing 0.1 to 20% by weight of one kind or two or more kinds of antistripping additives based on the total weight of the polymerizable liquid crystal compound.

6. The film according to claim 2, containing 0.1 to 20% by weight of one kind or two or more kinds of antistripping additives based on the total weight of the polymerizable liquid crystal compound.

7. The film according to claim 3, containing 0.1 to 20% by weight of one kind or two or more kinds of antistripping additives based on the total weight of the polymerizable liquid crystal compound.

8. The film according to claim 1, wherein the alignment layer includes a (meth)acrylate polymer, and a monomer used for forming the polymer includes photodimerizing or photoisomerizing structure as a photosensitive site.

9. The film according to claim 2, wherein the alignment layer includes a (meth)acrylate polymer, and a monomer used for forming the polymer includes photodimerizing or photoisomerizing structure as a photosensitive site.

10. The film according to claim 3, wherein the alignment layer includes a (meth)acrylate polymer, and a monomer used for forming the polymer includes photodimerizing or photoisomerizing structure as a photosensitive site.

11. The film according to claim 4, wherein the alignment layer includes a (meth)acrylate polymer, and a monomer used for forming the polymer includes photodimerizing or photoisomerizing structure as a photosensitive site.

12. The film according to claim 1, controlled in an alignment direction of the polymerizable liquid crystal compound therein, by rubbing, photoalignment treatment, nanoimprinting or orientation method.

13. The film according to claim 2, controlled in an alignment direction of the polymerizable liquid crystal compound therein, by rubbing, photoalignment treatment, -nanoimprinting or orientation method.

14. The film according to claim 3, controlled in an alignment direction of the polymerizable liquid crystal compound therein, by rubbing, photoalignment treatment, -nanoimprinting or orientation method.

15. The film according to claim 4, controlled in an alignment direction of the polymerizable liquid crystal compound therein, by rubbing, photoalignment treatment, -nanoimprinting or orientation method.

16. A liquid crystal display device using the film according to claim 1.

17. A three-dimensional image display apparatus, applying the liquid crystal display device according to claim 16.

* * * * *